United States Patent
Beale

(10) Patent No.: US 6,789,689 B1
(45) Date of Patent: Sep. 14, 2004

(54) CONTAINER WITH MULTIPLE INTEGRAL CONNECTION HANDLE, PREFORM AND METHOD OF MANUFACTURE

(75) Inventor: Glenn Robert Beale, Kings Langley (AU)

(73) Assignee: B & R Industries Pty Ltd (AU)

( * ) Notice: Subject to any disclaimer, the term of this patent is extended or adjusted under 35 U.S.C. 154(b) by 0 days.

(21) Appl. No.: 09/581,956

(22) PCT Filed: Dec. 17, 1998

(86) PCT No.: PCT/AU98/01039

§ 371 (c)(1),
(2), (4) Date: Nov. 17, 2000

(87) PCT Pub. No.: WO99/30883

PCT Pub. Date: Jun. 24, 1999

(30) Foreign Application Priority Data

| Dec. 17, 1997 | (AU) | PP0982 |
| May 8, 1998 | (AU) | PP3441 |
| Oct. 29, 1998 | (AU) | PP6803 |

(51) Int. Cl.[7] .................................................. B65D 23/10
(52) U.S. Cl. ........................ 215/398; 220/665; 264/537
(58) Field of Search .................................. 215/398, 396, 215/379, 382, 384, 42; 220/665, 669, 660; 264/537; 425/577, 533

(56) References Cited

U.S. PATENT DOCUMENTS

| 1,232,485 | A | * | 7/1917 | Bloom | 215/382 |
| 3,869,056 | A | * | 3/1975 | Valyi | 215/1 C |
| 4,311,246 | A | * | 1/1982 | Saito et al. | 215/100 A |
| 4,357,296 | A | * | 11/1982 | Hafele | 264/532 |
| 4,629,598 | A | * | 12/1986 | Thompson | 264/537 |
| 5,232,718 | A | * | 8/1993 | Miyazawa et al. | 425/577 |
| D376,731 | S | * | 12/1996 | Lin | D7/536 |
| 5,647,930 | A | * | 7/1997 | Bright | 156/73.5 |
| D403,244 | S | * | 12/1998 | Van Dyk et al. | D9/552 |
| 6,227,393 | B1 | * | 5/2001 | Takeuchi et al. | 215/396 |

FOREIGN PATENT DOCUMENTS

| EP | 805012 A1 | * | 5/1997 | 215/398 |
| JP | 3-90331 | * | 3/1991 | 215/398 |
| JP | 3-268907 | * | 3/1991 | 215/398 |
| WO | 96/30189 | * | 3/1996 | 215/398 |

* cited by examiner

*Primary Examiner*—Lien Ngo
(74) *Attorney, Agent, or Firm*—Stetina Brunda Garred & Brucker

(57) ABSTRACT

A preform (207,301), and a container (201,312,319) blown therefrom in a two stage process (as defined in the specification) is disclosed having a loop (202,304,313) defining a handle portion of the resulting blown container and wherein the loop is integrally connected by both a first end (306) and a second end (308) to respective first location (307) and second location (309) of the preform during manufacture of the preform.

7 Claims, 39 Drawing Sheets

CONTAINER WITH MULTIPLE INTEGRAL CONNECTION HANDLE, PREFORM AND METHOD OF MANUFACTURE

INTRODUCTION

This invention relates to a container with an integrally connected handle, preform from which the container is biaxially blown and a method of manufacture thereof and more particularly to a preform and resulting container having a handle integrally connected at at least two separate points.

BACKGROUND OF THE INVENTION

Attempts have been made to incorporate integral handles in PET and like injection blow moulded containers—for example see U.S. Pat. No. 4,629,598 to Thompson, assigned to Tri-Tech Systems International, Inc. The parison or preform from which the handled bottles of U.S. Pat. No. 4,629,598 are produced is illustrated in FIG. 1. To date, however, attempts to produce a practical, mass produced version of this arrangement have been unsuccessful. Instead, the best that appears to have been done in commercial practice is an arrangement whereby the blown containers are arranged to accept a clip on or snap on handle in a separate production step after the container itself is formed. See for example WO82/02371 and WO82/02370, both to Thompson.

Injection-stretch-blow moulding is a process in which the parison is stretched both axially and radially, resulting in biaxial orientation.

Biaxial orientation provides increased tensile strength (top load), less permeation due to tighter alignment of the molecules, and improved drop impact, clarity, and light-weighting of the container.

Not all thermoplastics can be oriented. The major thermoplastics used are polyethylene terephthalate (PET), polyacrylonitrile (PAN), polyvinyl chloride (PVC), and polypropylene (PP). PET is by far the largest volume material, followed by PVC, PP, and PAN.

The amorphous materials, e.g., PET, with a wide range of thermoplasticity are easier to stretch-blow than the partially crystalline types such as PP. Approximate melt and stretch temperatures to yield maximum container properties are:

| Material | Melt, Degrees C. | Stretch, Degrees C. |
| --- | --- | --- |
| PET | 280 | 107 |
| PVC | 180 | 120 |
| PAN | 210 | 120 |
| PP | 240 | 160 |

There are basically two types of processes for stretch-blow moulding: 1) single-stage in which preforms are made and bottles blown on the same machine, and 2) two-stage in which preforms are made on one machine and blown later on another machine.

Single-stage equipment is capable of processing PVC, PET, and PP. Once the parison is formed (either extruded or injection moulded), it passes through conditioning stations which bring it to the proper orientation temperature. The single-stage system allows the process to proceed from raw material to finished product in one machine, but since tooling cannot be easily changed, the process is best suited for dedicated applications and low volumes.

Oriented PVC containers most commonly are made on single-stage, extrusion-type machines. The parison is extruded on either single- or double-head units. Temperature conditioning, stretching, and thread forming are done in a variety of ways depending on the design of the machine. Many of the processes presently in use are proprietary.

Many oriented PET containers are produced on single-stage machines. Preforms are first injection moulded, then transferred to a temperature conditioning station, then to the blow moulding operation where the preforms are stretch-blown into bottles, and finally to an eject station.

With the two-stage process, processing parameters for both preform manufacturing and bottle blowing can be optimized. A processor does not have to make compromises for preform design and weight, production rates, and bottle quality as he does on single-stage equipment. He can either make or buy preforms. And if he chooses to make them, he can do so in one or more locations suitable to his market. Both high-output machines and low output machines are available. Heretofor two stage extrusion-type machines generally have been used to make oriented PP bottles. In a typical process, preforms are re-extruded, cooled, cut to length, reheated, stretched while the neck finish is being trimmed, and ejected.

It is an object of the present invention to produce a practical, readily implementable injection, stretch blow moulded container made from an orientable plastics preform material incorporating a handle joined in a loop at at least two points to the preform.

SUMMARY OF THE INVENTION

Accordingly in one broad form of the invention there is provided a preform for a container comprised of orientable plastics material and arranged so that the resultant blown container will include a handle or like support structure; said preform comprising a moulded structure having a neck portion and an expandable portion below the neck, at least one loop of orientable plastics material integrally connected at both a first end and a second end to a respective first location and a separate second location on said preform which when the container is formed constitutes said handle.

In a further broad form of the invention there is provided a method of forming a container having an integral handle; said method comprising:

(a) forming a preform having a neck portion and an expandable portion below the neck portion, said preform having at least one loop of orientable plastics material integrally connected at both a first end and a second end to a respective first location and a separate second location on said preform, and (b) performing a blow moulding operation on said preform to expand the expandable portion to form the body of the container.

In yet a further broad form of the invention there is provided a method of production as a two step process of an integral handle PET container from a preform which has a loop of orientable plastics material at least one loop of orientable plastics material integrally connected at both a first end and a second end to a respective first location and a separate second location on said preform; said method including the step of shrouding said loop of said preform during preheating of said preform preparatory to a stretch blow moulding step.

In yet a further broad form of the invention there is provided a container comprised of biaxially orientable plastics material manufactured from a two stage injection stretch blow moulding process; said two stage process comprising a first stage in which a preform is manufactured and a second stage in which said preform is reheated and biaxially stretched to form said container; said container including a graspable handle integrally affixed at at least a first point of connection and a second point of connection to said container so as to form an enclosed area between said handle and said container and through which at least two fingers of a human hand can pass.

In yet a further broad form of the invention there is provided an injection machine for the manufacture of a parison or preform as described above in a first stage of a two stage process.

In yet a further broad form of the invention there is provided a stretch blow moulding machine for the manufacture of a container having an integral handle, said machine operable according to the method described above.

In yet a further broad form of the invention there is provided an injection machine for the manufacture of preforms having integral handles incorporated therein; said machine including moulds having a channel which permits PET material to flow into a stem portion which constitutes a handle in a container blown from a preform produced by said injection moulding machine.

Preferably said channel of said mould includes a return portion whereby said stem is connected integrally at two points on said preform.

In yet a further broad form of the invention there is provided an injection blow moulding machine incorporating heat insulating means to insulate handle portions of preforms during heating of said preforms prior to stretch blow moulding thereof.

Preferably said insulating means comprises a shroud.

BRIEF DESCRIPTION OF THE DRAWINGS

Embodiments of the present invention will now be described by way of example, with reference to the accompanying drawings, in which.

DETAILED DESCRIPTION OF THE DRAWINGS

Figure 1:
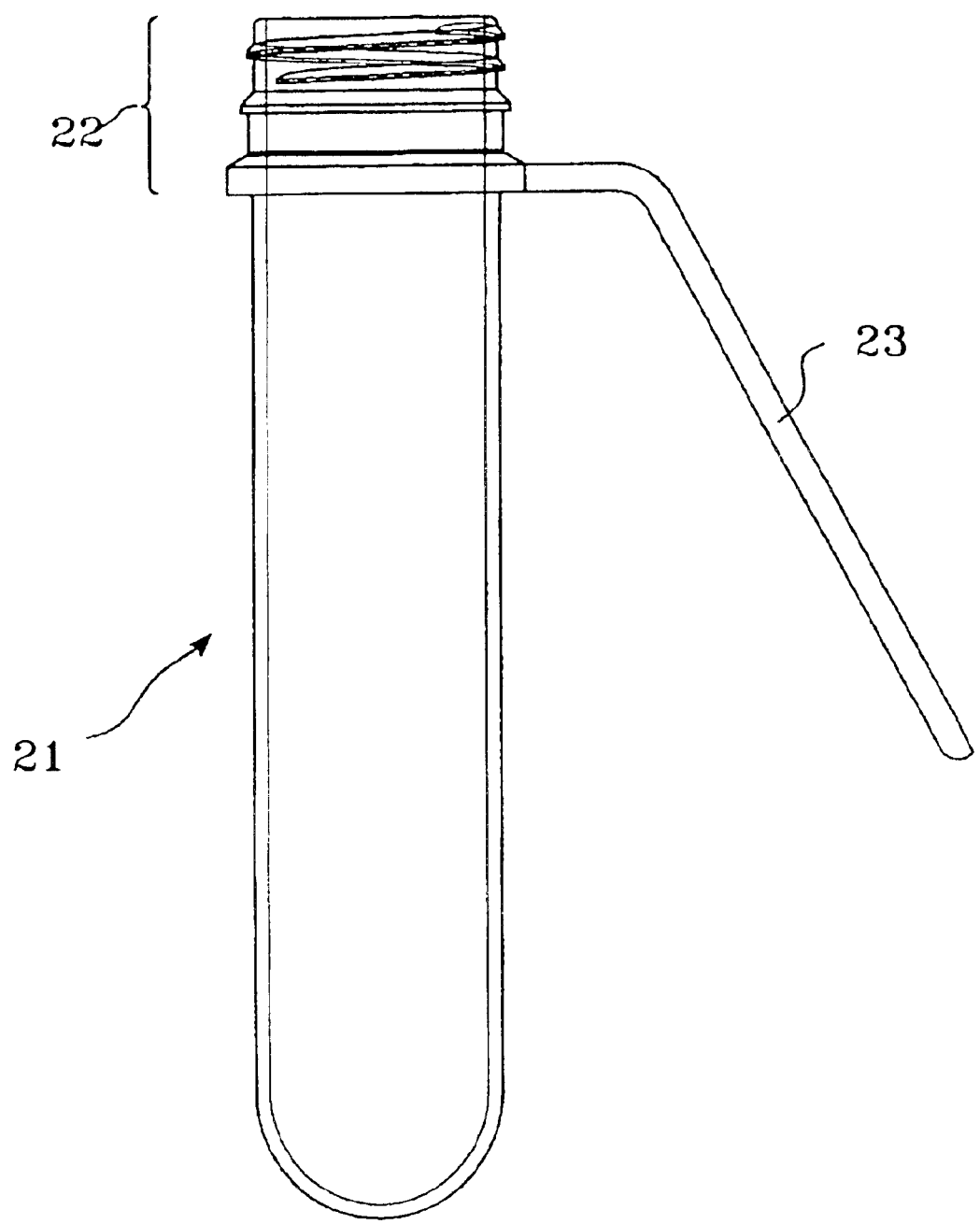
FIG. 1 is a side view of a prior art parison.

FIG. 1 illustrates a prior art preform or parison by way of introduction.

Figure 2:
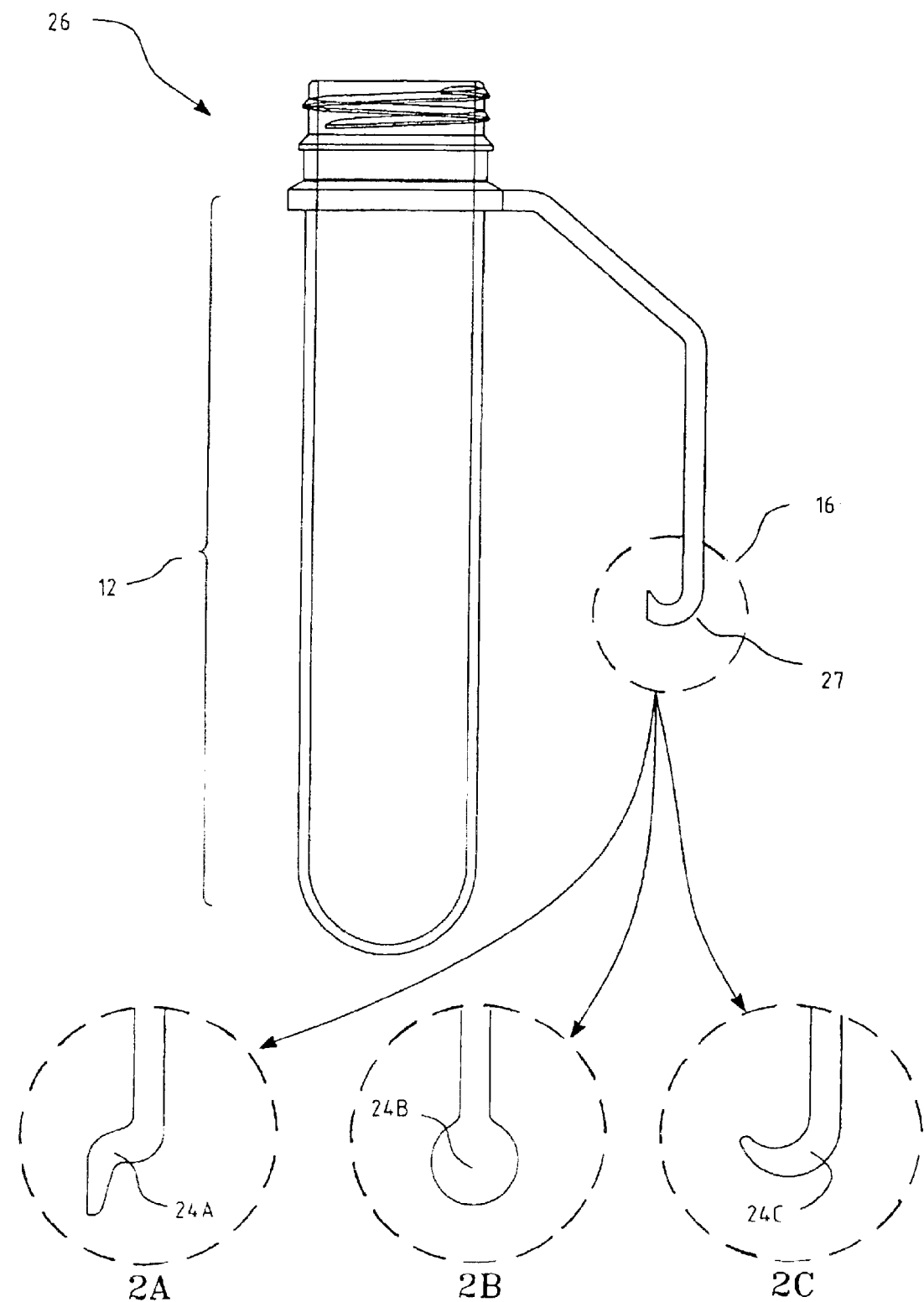
FIG. 2 is a side view of a parison incorporating features usable with embodiments of the present invention.

FIGS. 2 through to 41 illustrate preform and resulting containers and methods of manufacture thereof and machinery for manufacture thereof which can be adapted according to embodiments of the invention to include multiple integral connection of the handle stem or loop to the preform and resulting container.

In this specification the term "integral connection" or "integrally connected" means a connection between the handle and the preform (and subsequently the corresponding connection on the container blown from the preform) which is made from the same material as the handle and the preform and is formed as an inherent part of an at the same time as the preform is formed.

All embodiments of the invention are produced in a two stage process.

The two-stage process is the lowest-cost method to produce oriented PET containers. The two-stage process, which provides injection moulding of the preform and then shipping to blow moulding locations, allows companies to become preform producers and to sell to blow moulding producers. Thus companies that wish to enter the market with oriented PET containers can minimise their capital requirements. Two-stage stretch-blow moulding also can be used for production of oriented PVC containers. Preform design and its relationship to the final container remains the most critical factor. The proper stretch ratios in the axial and hoop directions are important if the container is to properly package its intended product. Exemplary ratios are as follows:

| Material | Stretch Ratios | Orientation Temp. Deg. F. |
|---|---|---|
| PET | 16/1 | 195–240 |
| PVC | 7/1 | 210–240 |
| PAN | 9/1 | 220–260 |
| PP | 6/1 | 260–280 |

Figure 3:
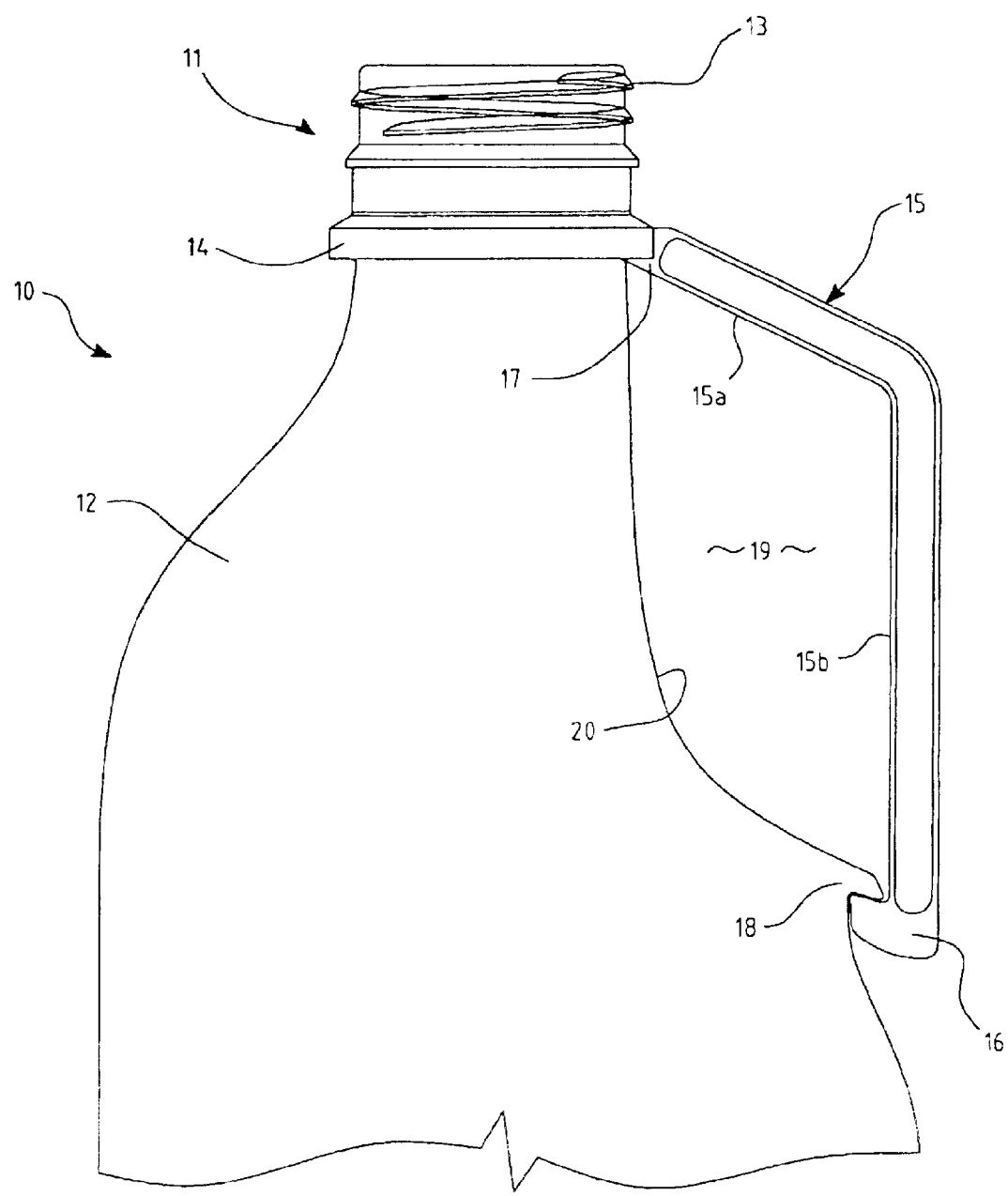
FIG. 3 is a partial side elevational view of a blow moulded PET container formed from a preform usable with one embodiment of the invention.

A container 10 usable with an embodiment of the invention is shown in FIG. 3. It includes a neck 11 and an expanded portion 12.

The neck 11 has a threaded portion 13 and a locating ring 14. Moulded integrally with the ring 14 is a stem 15 having a first portion 15a extending outwardly from the ring 14 and a second portion 15b so inclined to the first portion 15a that it is nearly parallel to a vertical axis of the container 10. In this instance, the first portion 15a subtends an angle of slightly more than 45° to the wall 20 and the second portion subtends an angle of about 20° to the wall 20.

The particular shape of the stem 15 is selected so that when formed as a handle it may be grasped by fingers of the human hand.

The stem 15 terminates in a stem end 16 which faces generally downwardly in he general direction of closed end of the container 10.

In this instance, the stem 15 is of I-shaped cross-section to combat unwanted effects arising at or near junction 17 of stem 15 with the ring 14 following a blowing operation on the preform 26.

These unwanted effects particularly include stress effects and air inclusions resulting from non-uniform cooling through preform volumes of differing cross-section.

In this arrangement, the preform is made from PET and is prepared utilizing a heated mould.

In order to produce the container 10, the parison or preform 26 (see FIG. 2) according to an embodiment of the invention can be placed in a blow moulding machine (not shown) and blow moulded according to bi-axial orientation blow moulding techniques with the neck 11 being held in a mould in such a way as not to expand. Initially, the expandable portion of the preform below the neck can be mechanically stretched downwardly to the bottom of the mould and then the bulk of the preform can be blown outwardly by application of compressed air to the extent that a support portion 18 is formed around the stem end 16 such that an enclosed area 19 is formed between wall 20 of the container 10 and the stem 15 in the process of the formation by blow moulding of container 10.

In a particular form, the enclosed area 19 is of sufficient cross-sectional area to allow at least two fingers of a human hand to be inserted therethrough and to grasp handle 15 so as to support the container 10.

The blow moulding operation is carried out in such a way so as to provide a bottle or container having optimum strength by achieving biaxial orientation of the molecules of the preferred PET material as well as improved barrier properties to reduce oxidation.

In accordance with an embodiment of the invention, the neck 11 and handle 15 can be crystallised by over-heating those parts of the preform. The crystallisation of the handle increases its rigidity which assists orientation of the preform and permits the use of less material.

Crystallisation of the neck and handle can be carried out by running hot oil over the neck and handle, applying an open flame or by blowing hot air.

The location of the handle 15 on the ring 14 ensures that there is minimum interference to the blow moulding process applied to the remainder of the preform. Either a one stage or two stage process can be used.

DETAILED DESCRIPTION OF FURTHER EMBODIMENTS

FIG. 1 illustrates the prior art preform or parison 21 of U.S. Pat. No. 4,629,598. The concept of this prior art disclosure is to form a handle portion 23 from the locating ring of non-expandable portion 22 of the parison 21.

With reference to FIG. 2 and with reference to the detailed description of the preferred embodiment this arrangement of FIG. 1 is modified according to the present invention in a number of respects.

Insets 2A, 2B and 2C show bulbous portions 27 forming part of stem end 16 in the shape, respectively of a downwardly extending hook 24a, a bulb 24b and an upwardly extending hook 24c.

These portions have in common a shape which is adapted to engage mechanically with a blown portion of the container 10 which is adapted to envelop the bulbous portion 27.

The process by which the second stage blow of the expandable portion 12 of parison 26 is effected so as to envelope the bulbous portion 27 of stem end 16 is a stretch blow, biaxial orientation process.

Figure 4:
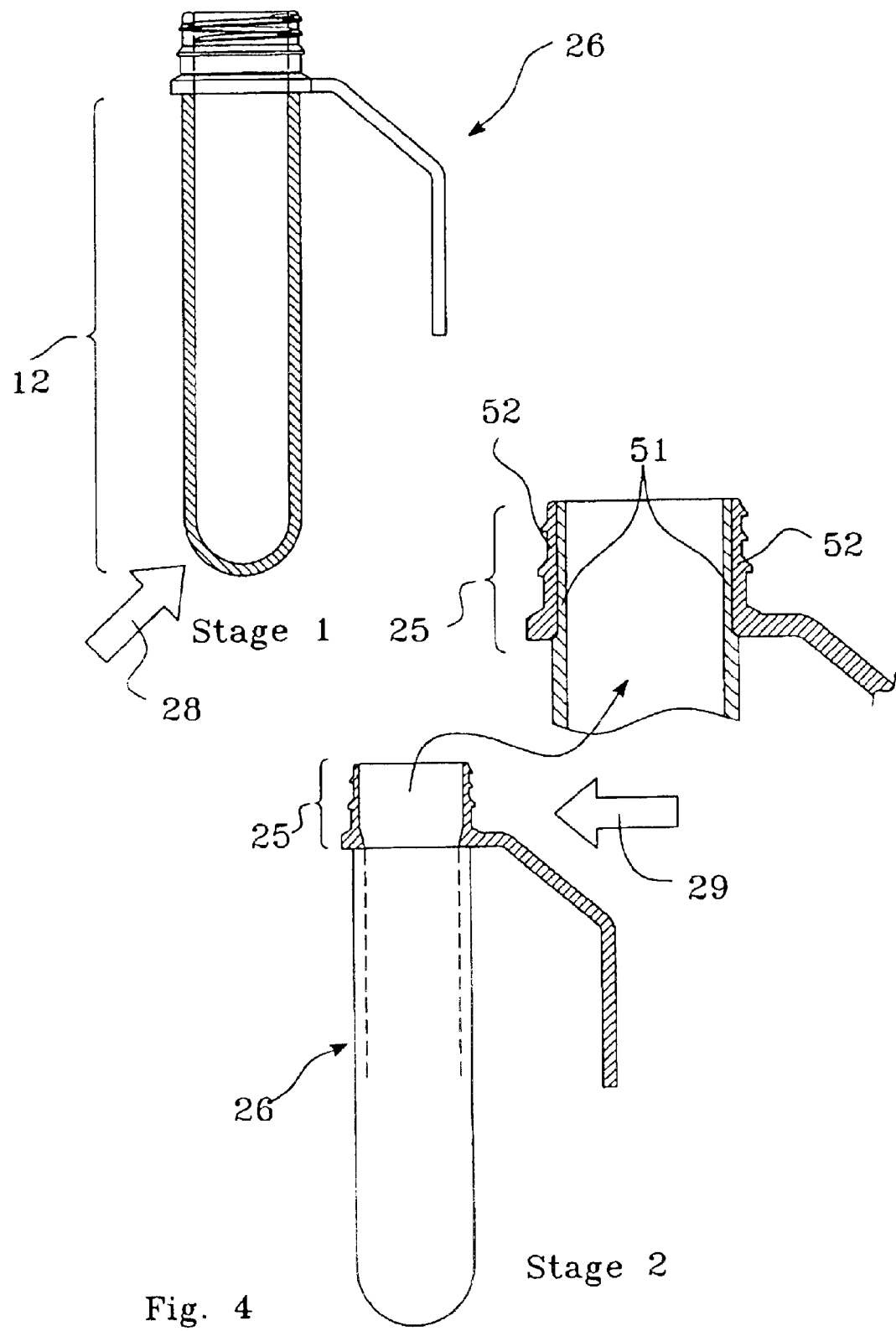
FIG. 4 illustrates the steps of formation of a parison usable with another embodiment of the invention.

With reference to FIG. 4 a particular method of manufacture of the preform or parison 26 is illustrated. It includes a two stage process for the formation of the parison by an injection moulding process. In Stage 1 a first injection mould inlet 28 permits entry of plastics material for the formation of the expanded portion 12 of the parison. 26 (expanded in the blow moulding stage of container formation, with reference to FIG. 3).

In a second stage of the injection moulding process for the formation of parison 26 a second injection mould inlet 29 permits entry of plastics material for the formation of the non-expandable portion 25 of parison 26.

The two stage injection arrangement is such that different plastics materials may be injected through first injection mould inlet 28 and second injection mould inlet 29.

In a particular form the plastics material injected in first injection mould inlet 28 is non-recycled or substantially non-recycled plastics material whilst the plastics material injected into second injection mould inlet 29 is recycled or at least partially recycled plastics material.

This arrangement permits controlled use of proportions of recycled and non-recycled plastics material in order to achieve optimum economics in the construction of parison 26.

In a modification of this arrangement the Stage 2 step can include the production of two walls in the non-expandable portion 25 comprising inner wall 51 and outer wall 52. Inner wall 51 is made from virgin or non-contaminated PET material and acts as an insulation barrier with respect to wall 52 which can be made from recycled material 52. This dual wall arrangement can be produced by use of a sliding core arrangement as a modification in the die arrangement and process described with reference to FIGS. 6, 7 and 8 later in this specification.

Of course the Stage 1 and Stage 2 steps of FIG. 4 can be interchanged in order.

Figures 5A, 5B:
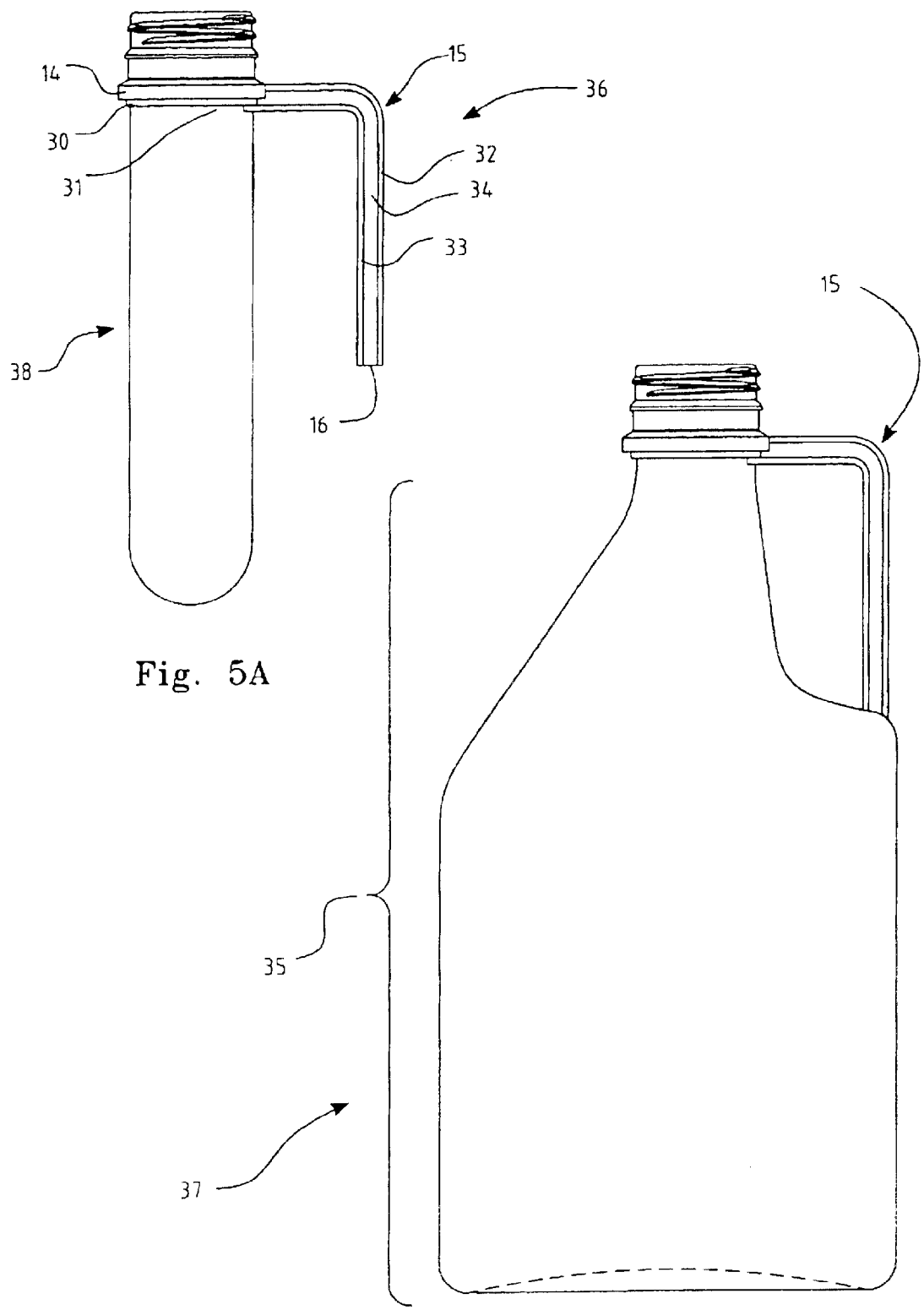
FIG. 5A is a side view of a preform according to a further embodiment of the invention.
FIG. 5B is a side view of a container formed from the preform of FIG. 5A.

A parison and resulting container according to a further arrangement are illustrated in FIGS. 5A and B respectively. Like parts are numbered as for previous embodiments.

In this arrangement the parison 36 includes a locating ring 14 immediately below which is a first non-expanding region 30 and a second non-expanding region 31. The first non-expanding region 30 may itself be formed so as to be slightly raised or otherwise differentiated from the expandable portion of parison 36. Second non-expanding region 31 may not be differentiated from the expandable portion of parison 36 but, in use, the blowing operation will be such as to ensure that the second non-expanding region 31 is not expanded in the blowing process.

In this case the stem 15 includes a first rib 32 integrally moulded with and extending from locating ring 14. The stem 15 also includes second rib 33 integrally moulded with and extending from second non-expanding region 31. Stem 15 further includes a rib connector 34 integrally moulded with and extending from first non-expanding region 30 and forming a continuous connection between first rib 32 and second rib 33 throughout the length of stem 15.

The parison 36 of FIG. 5A is then blown in the manner previously described to form the volume 35 of container 37 illustrated in FIG. 5B. The neck portion including stem 15, ring 14, first non-expanding region 30 and second non-expanding region 31 remain unexpanded whilst the expandable portion 38 of parison 36 is biaxially stretched to form the major volume 35 of container 37. The stem end 16 may include the bulbous portions according to the previously described embodiments for connection to container 37 or, either alternatively or in addition can include the application of an adhesive material whereby a chemical bond is formed between stem end 16 and the wall of container 37 by the use of a chemical intermediary.

In a modification of the arrangement of FIG. 5A and FIG. 5B first non-expanding region 30 and second non-expanding region 31 can form part of a single non-expanding region.

In yet a further modification second non-expanding region 31 can be located in the temperature transition zone of the container and wherein minor expansion during the blow moulding step may take place.

In yet a further modification both first non-expanding region 30 and second non-expanding region 31 may be located in the temperature transition zone immediately below the locating ring 14 and, again, minor expansion of these regions may take place during blowing.

With respect to the last two variations described advantage is taken of the observation that expansion at the temperature transition zone can be limited by appropriate mould design and process control whereby unwanted distortion effects caused by the rigid interconnection of this temperature transition zone 30, 31 via second rib 33, and rib connector 34 to ring 14 (or other non-expanding portion of the neck 11) can be controlled.

Figure 6:
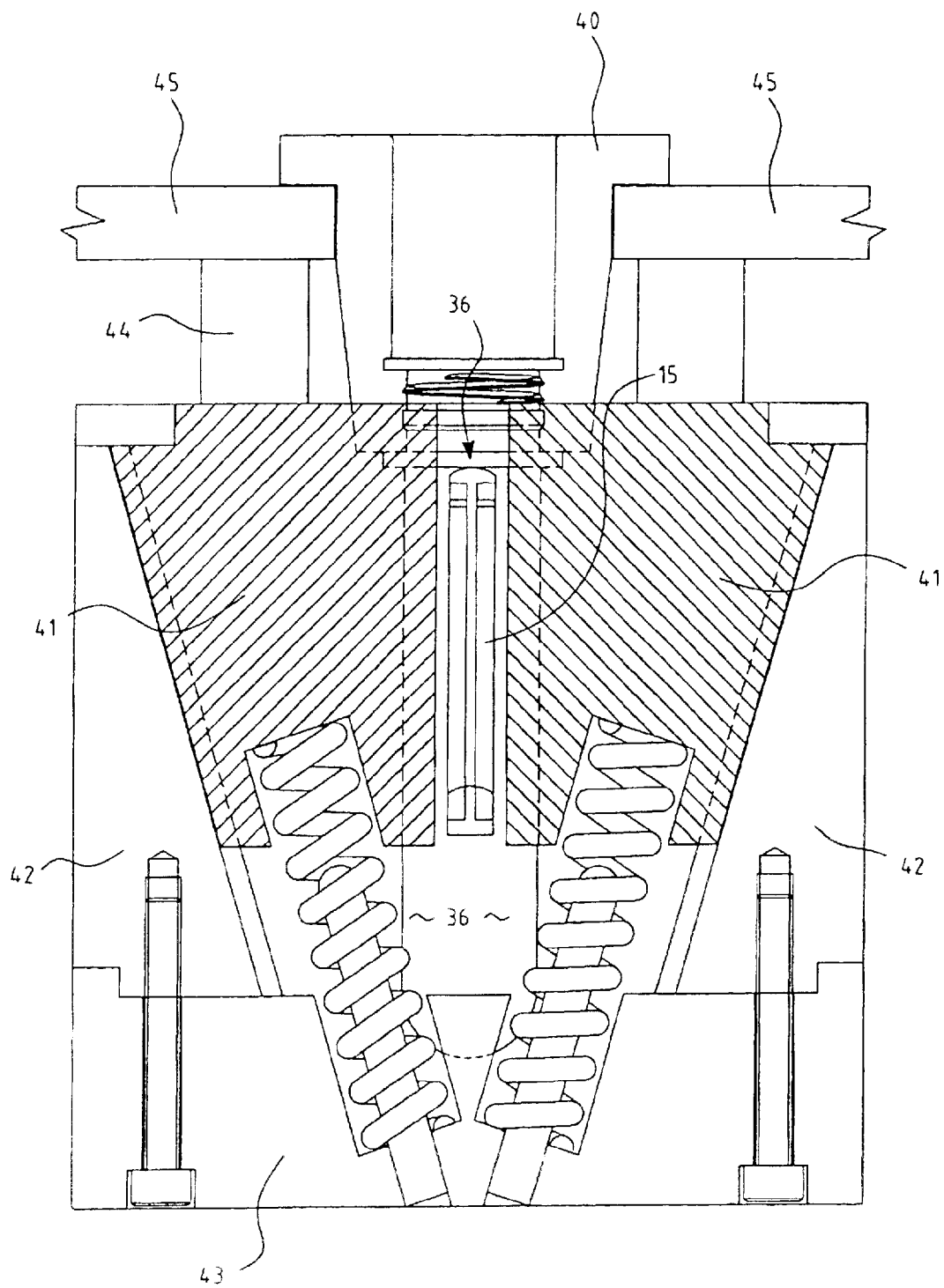
FIG. 6 is a side view of a die in open position for manufacture of a preform.
Figure 7:
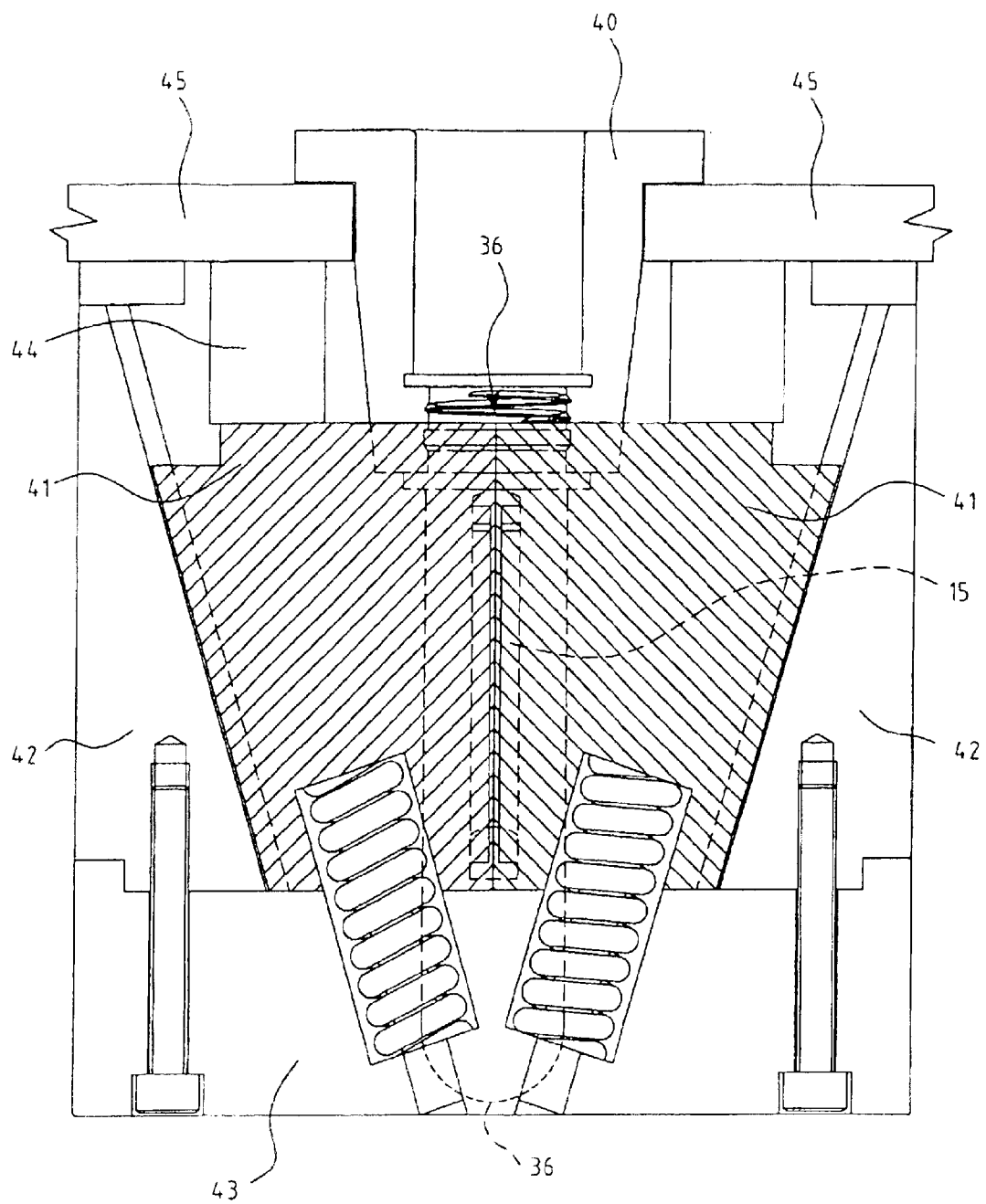
FIG. 7 is the die of FIG. 6 in closed position.
Figure 8:
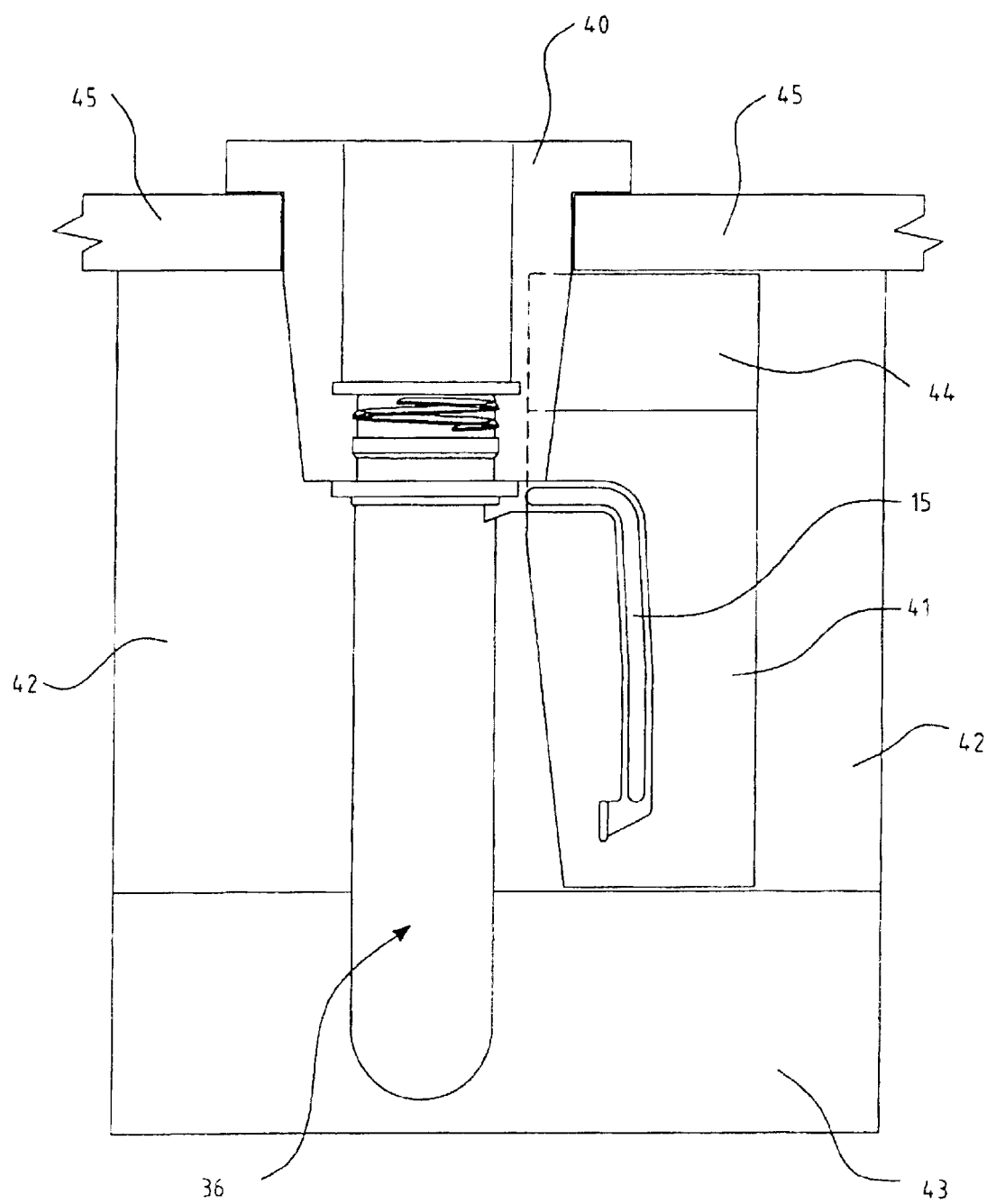
FIG. 8 is a side view of the die of FIGS. 6 and 7 showing the stem of the preform located therein.

In use preforms and containers blown therefrom can be manufactured as follows: A preform is formed from orientable plastics material, preferably PET or like material in an injection moulding process. Slidable dies are illustrated in FIGS. 6, 7 and 8 and include a sliding core 40, sliding blocks 41, body 42, base 43, push block 44 and splits holder 45. FIG. 6 illustrates the die in open position, FIG. 7 illustrates the die in closed position and FIG. 8 illustrates a side view showing accommodation of the stem 15.

The completed preforms in a second and preferably separate step are subsequently passed to a stretch blow mould machine where the preforms are first reheated to the appropriate transition temperature (refer introduction). The non-expandable portion of the preform including locating ring 14 and stem 15 are shielded substantially from the reheat process by appropriate guarding. In most instances there is likely to be a temperature transition zone in the region 30, 31 described with reference to FIGS. 5A, 5B.

The reheated preform is then placed in a mould and biaxially stretched and the expandable portion blown to full size utilising processes known in the art. During this process the preform is supported at neck 14 and may also be supported at stem 15. Stem 15 does not take part in the blow process although its stem end 16 may be partially enveloped by an external wall of the blown container.

DETAILED DESCRIPTION OF METHODS OF MANUFACTURE INCORPORATING MODIFIED TWO STAGE STRETCH BLOW MOULDING MACHINES

Figure 9:
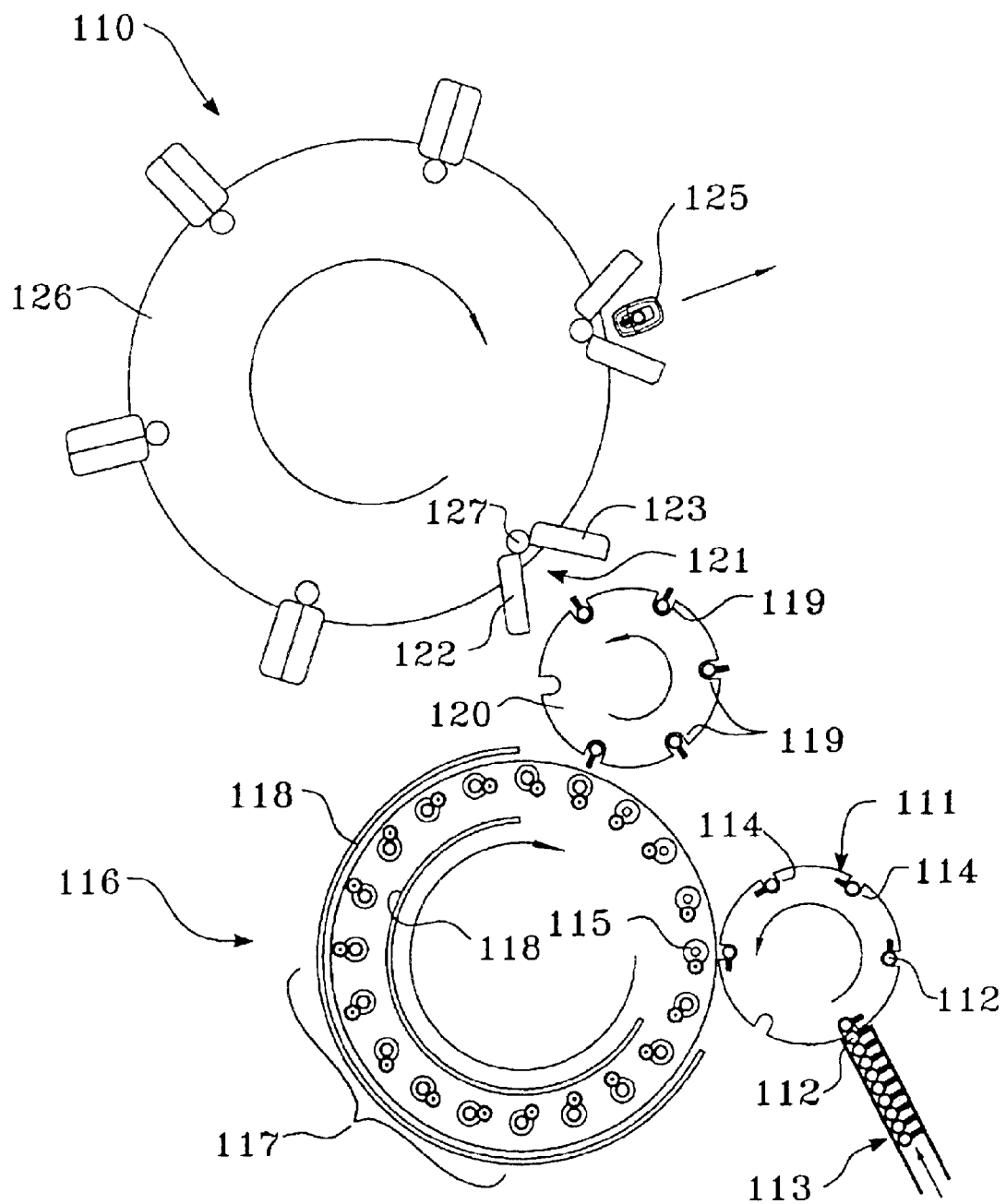
FIG. 9 is a top view of a two stage injection, blow mould machine adapted to receive preforms and biaxially orient them into blown containers according to embodiments of the invention.

FIG. 9 illustrates a modified two stage stretch blow mould machine 110 adapted to stretch blow mould (including biaxial orientation) of the preforms of previous embodiments and preforms of further embodiments to be described below with reference to later figures.

The machine 110 comprises a first carousel 111 adapted to receive integral handle preforms 112 from inclined chute 113 into apertures 114 spaced around the periphery thereof.

As first carousel 111 rotates it moves, via apertures 114 the preforms 112 from the chute 113 to a second carousel loading position where the preform 112 is transferred to a spindle 115 mounted near the periphery of second carousel 116.

A sector of approximately 270° of second carousel 116 is arranged as a preheating tunnel 117 where the preforms 112 are progressively heated by a heating bank mounted in opposed relationship to the path of travel of the preforms.

The suitably preheated preforms 112 are loaded consecutively into apertures 119 of a third carousel 120 which acts as a transfer mechanism to both suitably orient the preforms 112 about their longitudinal axis and present them to a mould cavity 121 comprising first half mould 122 and second half mould 123.

It should be noted that during their time in preheating tunnel 117 the preforms 112 are rotated about their longitudinal axis by spindles 115 and have a handle shroud 124 mounted over the preform stem which subsequently forms a handle for blown container 125. Details of the rotation of spindles 115 and the shrouding of the preform stem are discussed more fully with reference to FIGS. 10, 11 and 12.

Mould cavities 121 are mounted on the periphery of a fourth carousel 126. During their travel through approximately a 270° sector the half moulds 122, 123 rotate to a closed position about their axis 127 and, whilst closed, the preform 112 enclosed therein is blown and biaxially stretched in known manner in order to produce an integral handle, blown container 125. This container 125 is ejected as illustrated when the half moulds open preparatory to receiving a fresh, preheated preform 112.

Figure 10:
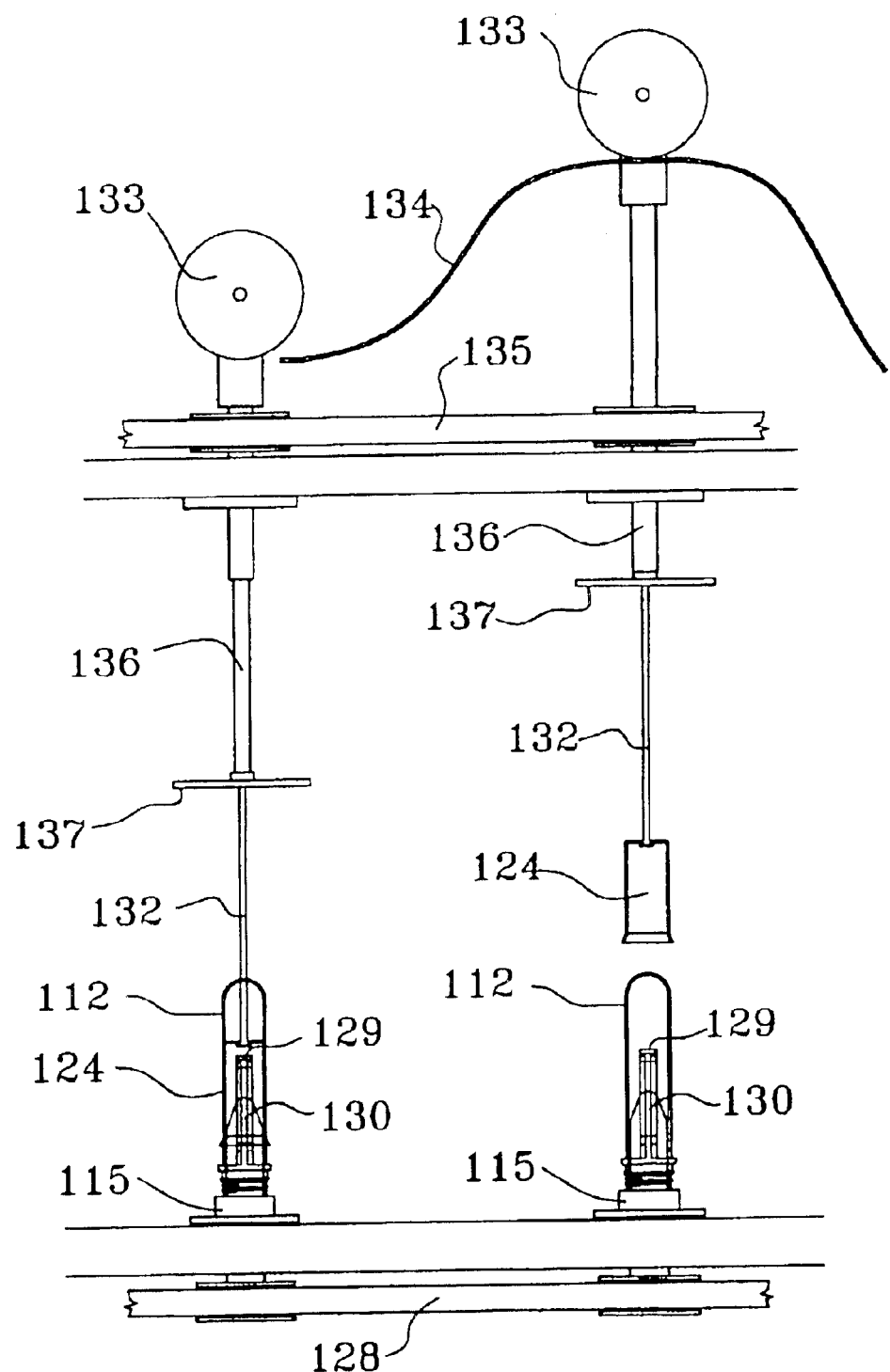
FIG. 10 is a side section view of a lifting, lowering and rotating mechanism for handle covers for use with the machine of FIG. 9.

With reference to FIG. 10 further detail is shown of spindles 115 and handle shrouds 124 and their manner of operation upon and in relation to preforms 112 whilst passing through preheating tunnel 117 on second carousel 116.

The spindles 15 are rotated by band drive 128 so as to, in one embodiment, rotate the preforms 112 through approximately four full axial rotations during their passage through the preheating tunnel 117.

Figure 12:
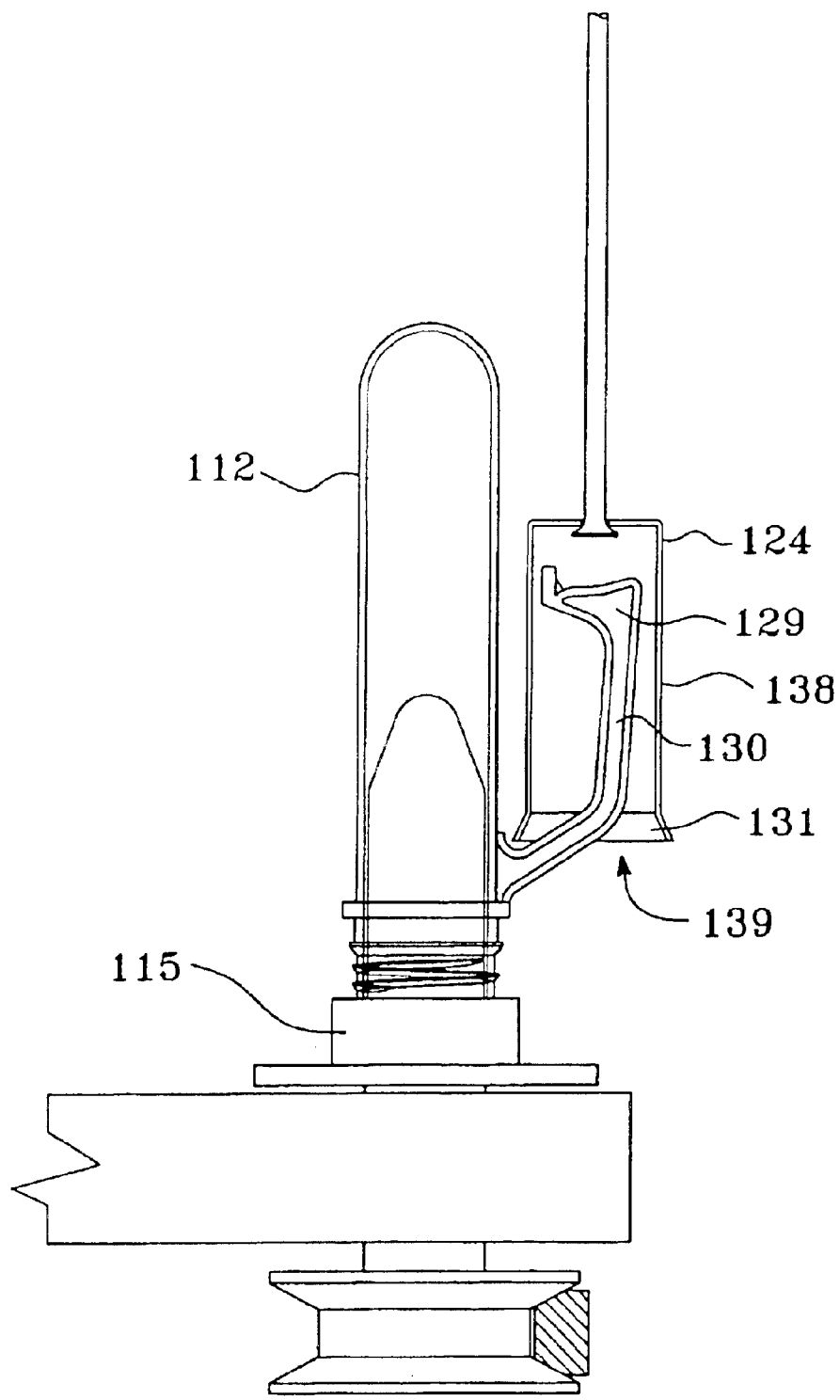
FIG. 12 is a side section, close up view of the machine of FIG. 9 showing a preform with handle cover lowered over the handle portion thereof, FIGS. 13A,B illustrates first and second side section views of a preform adapted for loading into the machine of FIG. 9.

Whilst in the preheating tunnel 117 a handle shroud 124 is lowered over the free end 129 of handle stem 130 so as to fully shroud the handle stem 130 as best seen in greater detail in FIG. 12.

The shroud 124, in one preferred form, is cylindrical save for a fluted open mouth 131 best seen in FIG. 12. The fluted mouth 131 assists in ensuring maximal shrouding of handle stem 130 and also assists in guiding the shroud 124 onto the free end 129 of stem 130.

Lifting and lowering of the shroud 124 is effected through a shroud support stem 132 which is suspended from a cam follower 133 adapted to travel on cam 134.

The stems 132 are themselves rotated by band drive 135 so as to follow the rotation of spindles 115. As best seen in end view of FIG. 11 the shroud support stem 132 is offset from the cam follower stem 136 by virtue of being mounted near the periphery of platten 137.

As cam follower 133 rides up cam 134 it pulls handle shroud 124 up with it by virtue of the connecting link comprising shroud support stem 132, platten 137 and cam follower stem 136.

Cam follower stem 136 can comprise a telescoped arrangement allowing relative axial rotation between two component, telescoping parts thereof The handle shroud 124 can comprise alternative shapes other than cylindrical, for example an oval cross section is possible although the cylindrical arrangement having a circular cross section is preferred.

The handle shroud 124 is preferably made of insulating material such as a ceramic material and is covered on an exterior surface 138, in a preferred version, with a heat reflecting material which, ideally, is also light reflecting.

In use the reflective surface 138 causes light and heat emanating from heating bank 118 to be reflected thereof whereby two functions are performed. The first function involves protecting the handle stem 130 from heat. The second function is to reflect heat and light in the direction of that portion of the preform closest to the handle stem 130 so that it is evenly heated and tends not to be shadowed by the stem 130.

In one particular form the handle shrouds 124 can be cooled by an air or nitrogen blast (not shown) directed at them whilst they are lifted clear of the preform 112. This will assist to prevent radiated and/or convected heat building up within the cavity 139 of the shroud 124.

Figure 13:
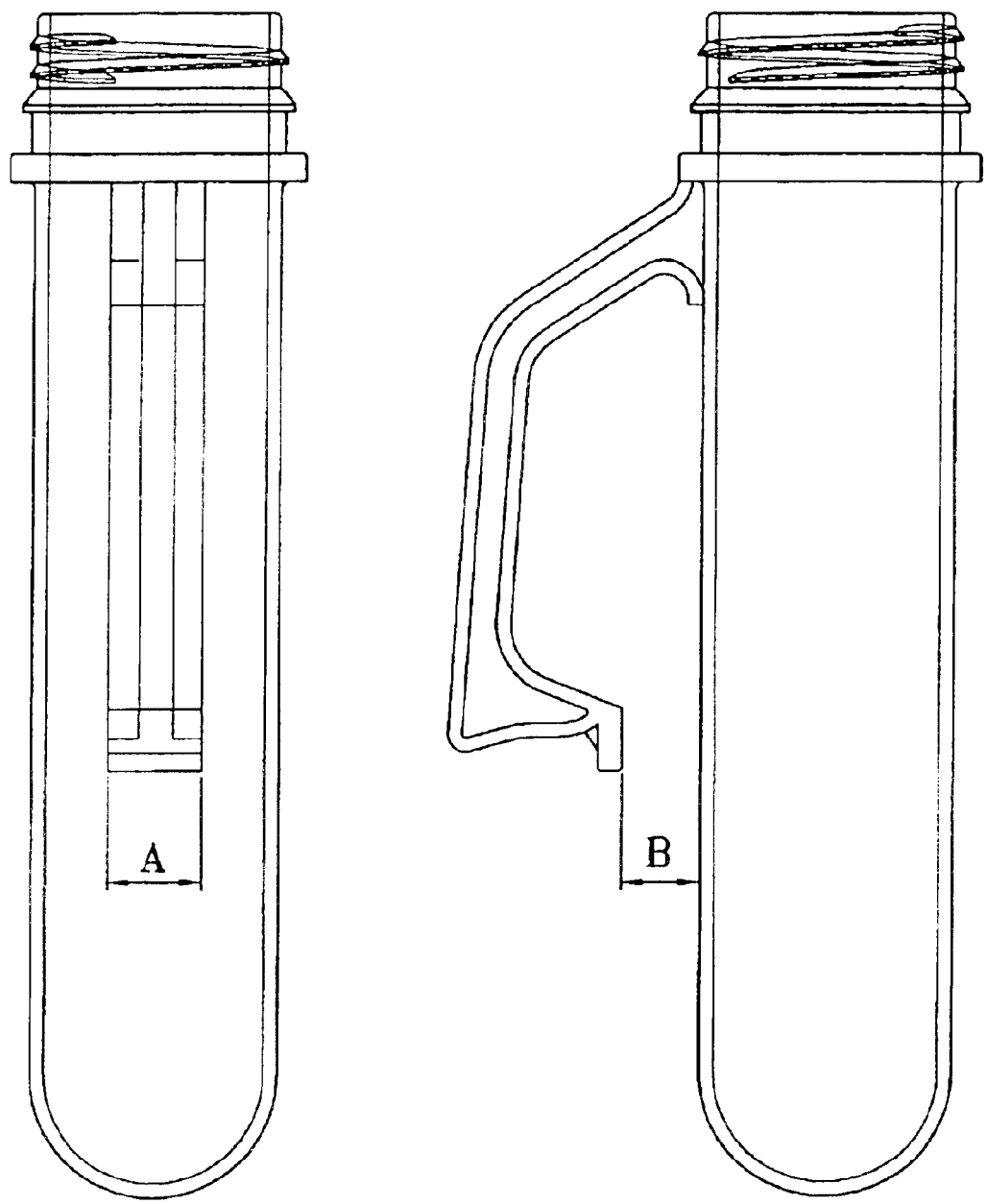
Figure 15:
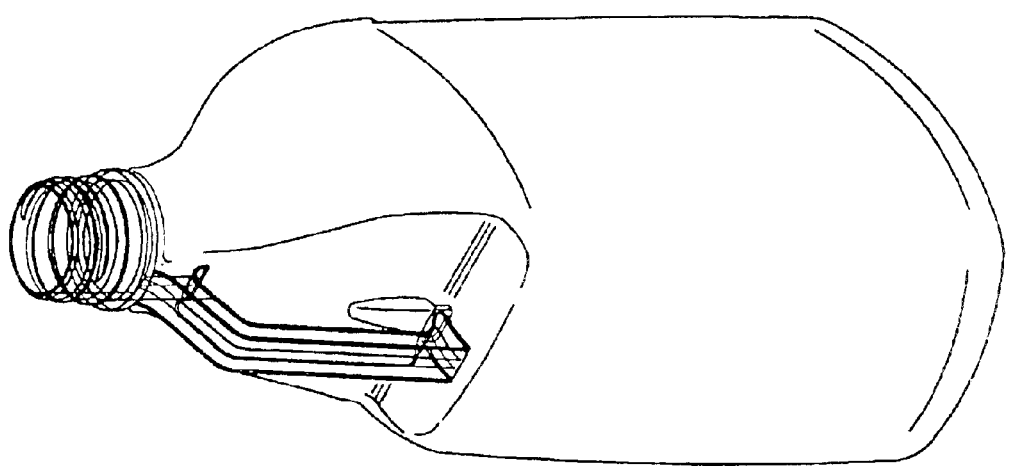
FIG. 15 is a perspective view of a container blown from the preform of FIG. 14 on the machine of FIG. 9.
Figure 14:
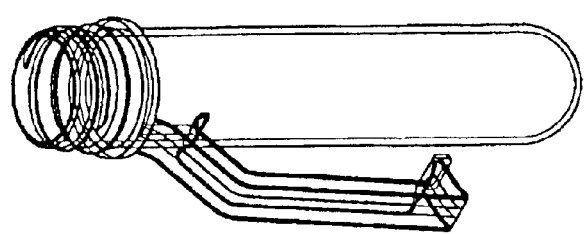
FIG. 14 is a perspective view of the preform of FIG. 13.
Figure 17:
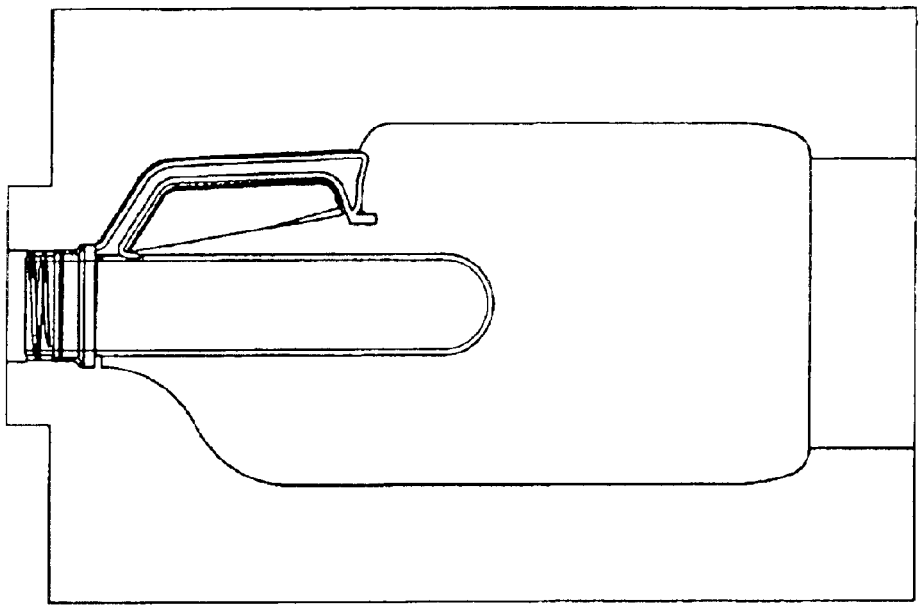
FIG. 17 is a top view of the mould of FIG. 16 with a preform inserted therein ready for blowing on the machine of FIG. 9.
Figure 16:
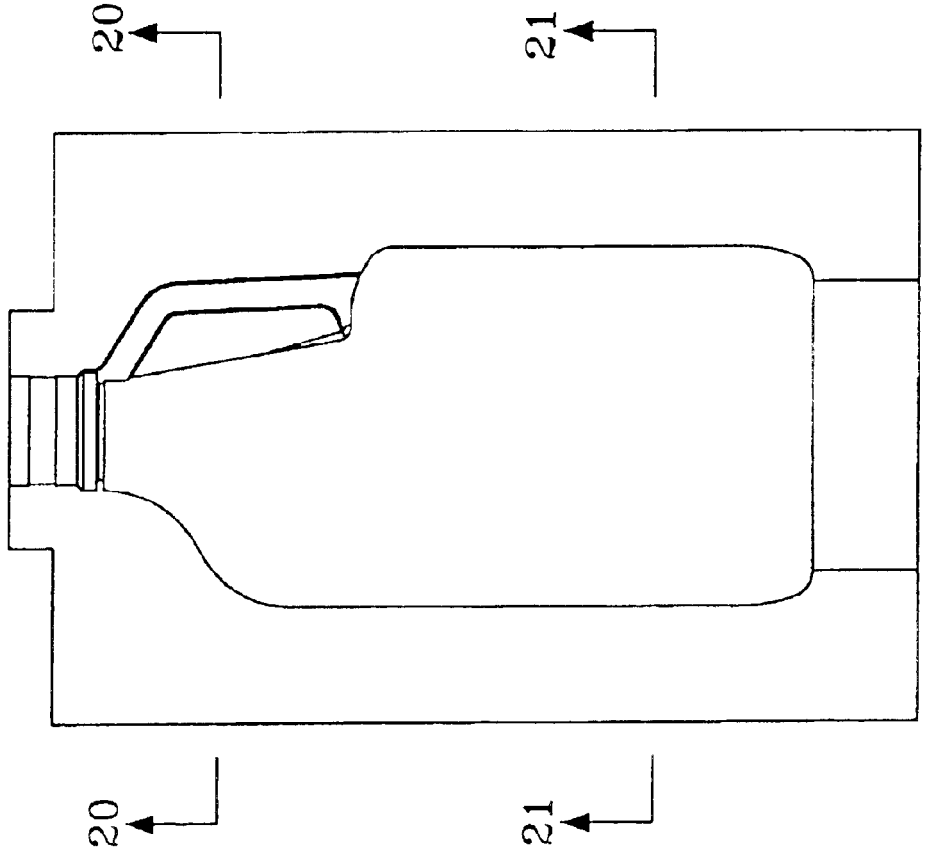
FIG. 16 is a plan view of a half mould adapted for blowing preforms on the machine of FIG. 9.
Figure 18:
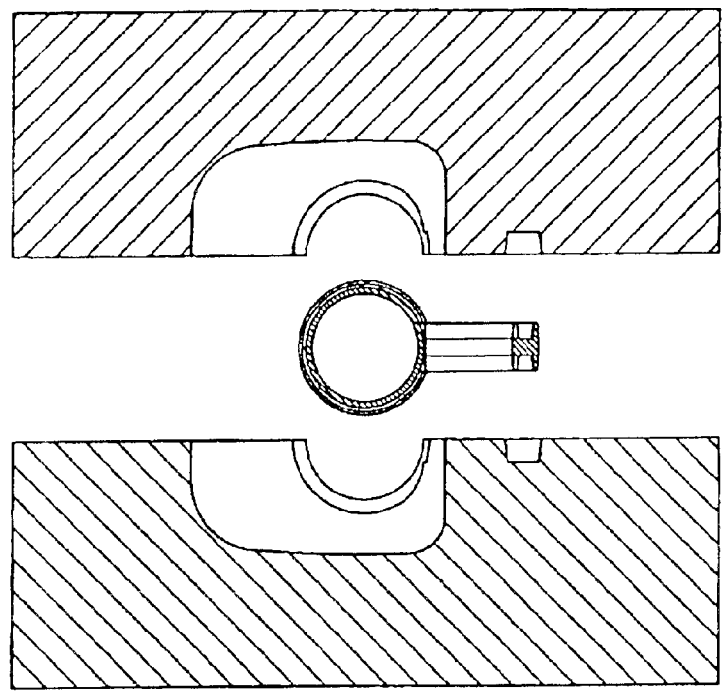
FIG. 18 is a bottom view of FIG. 17 with both half moulds in opposed relationship.
Figure 19:
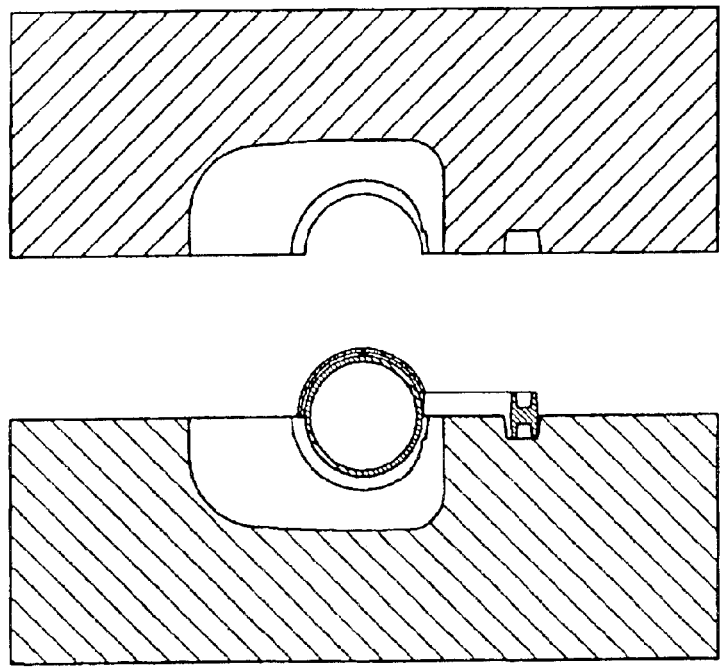
FIG. 19 is a further bottom view of FIG. 17 showing the preform in the position of FIG. 17.
Figure 20:
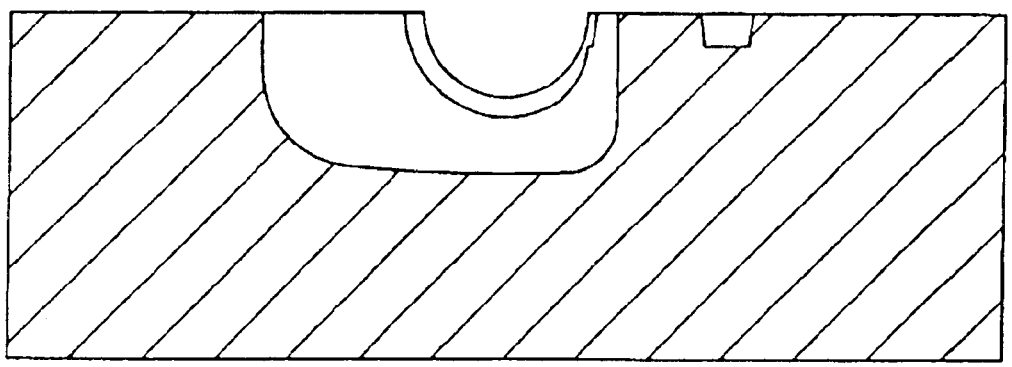
FIG. 20 is a section view through the half mould of FIG. 16.
Figure 21:
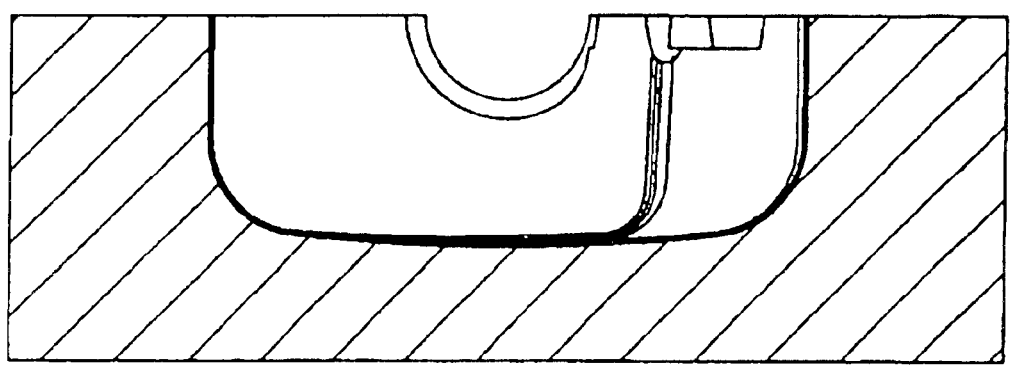
FIG. 21 is a section view through the mould of FIG. 16.
Figure 23:
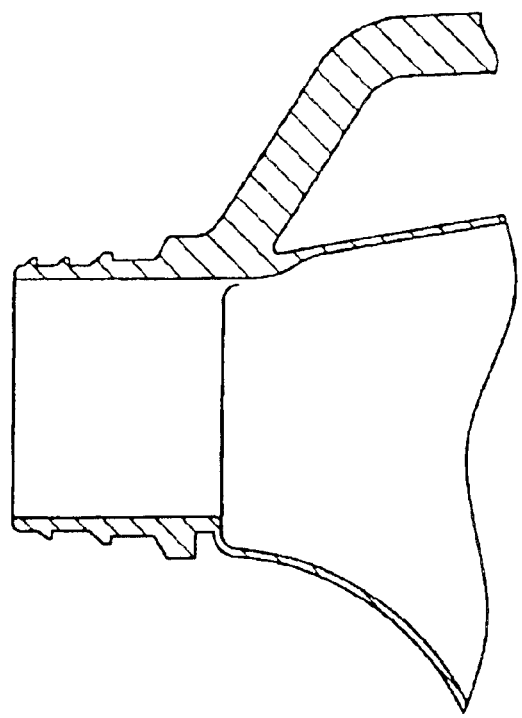
FIG. 23 is a detail, side section view of the neck and top handle portion of the container of FIG. 22.
Figure 22:
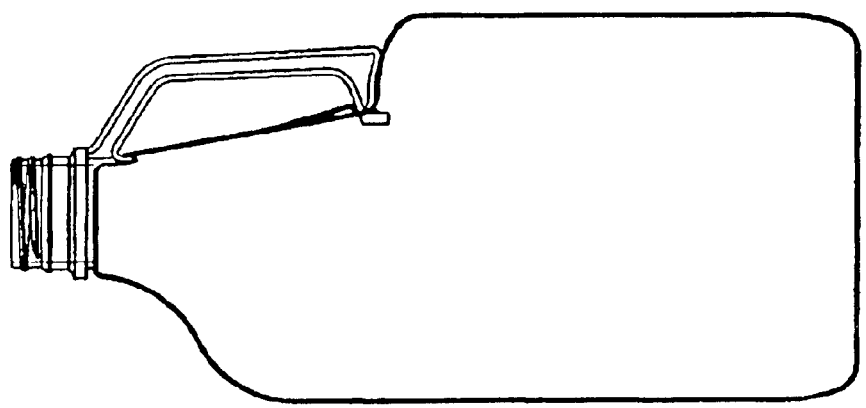
FIG. 22 is a side view of the container of FIG. 15 blown in the mould of FIG. 19 from a preform as illustrated in FIG. 13 and 14.
Figure 24:
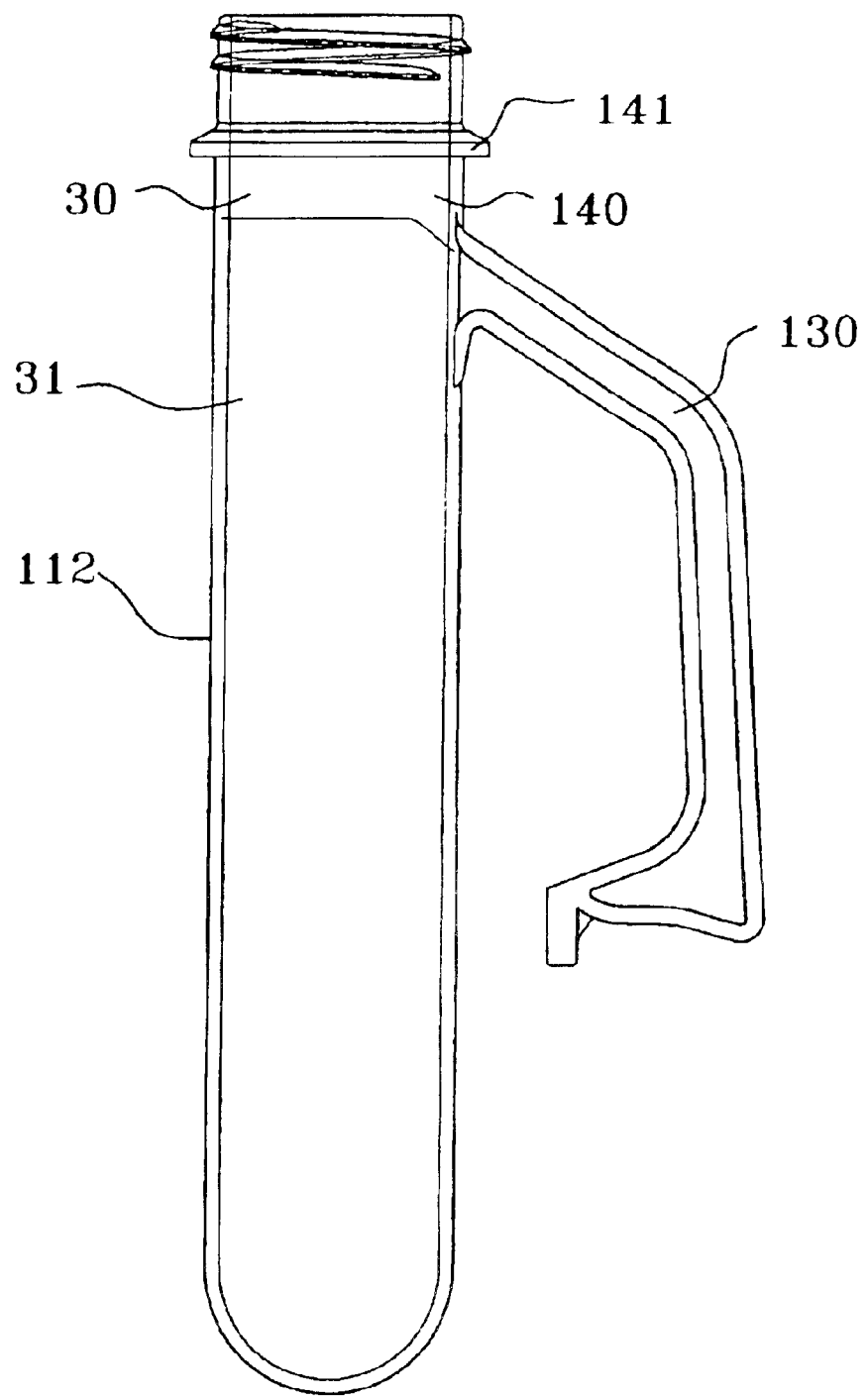
FIG. 24 is a side view of a preform incorporating an enlarged first non-expanding region usable with embodiments of the invention.
Figure 25:
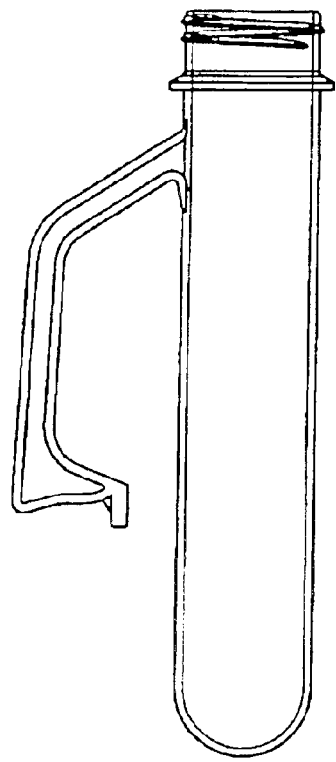
FIG. 25 is an alternative side view of the preform of FIG. 24.
Figure 26:
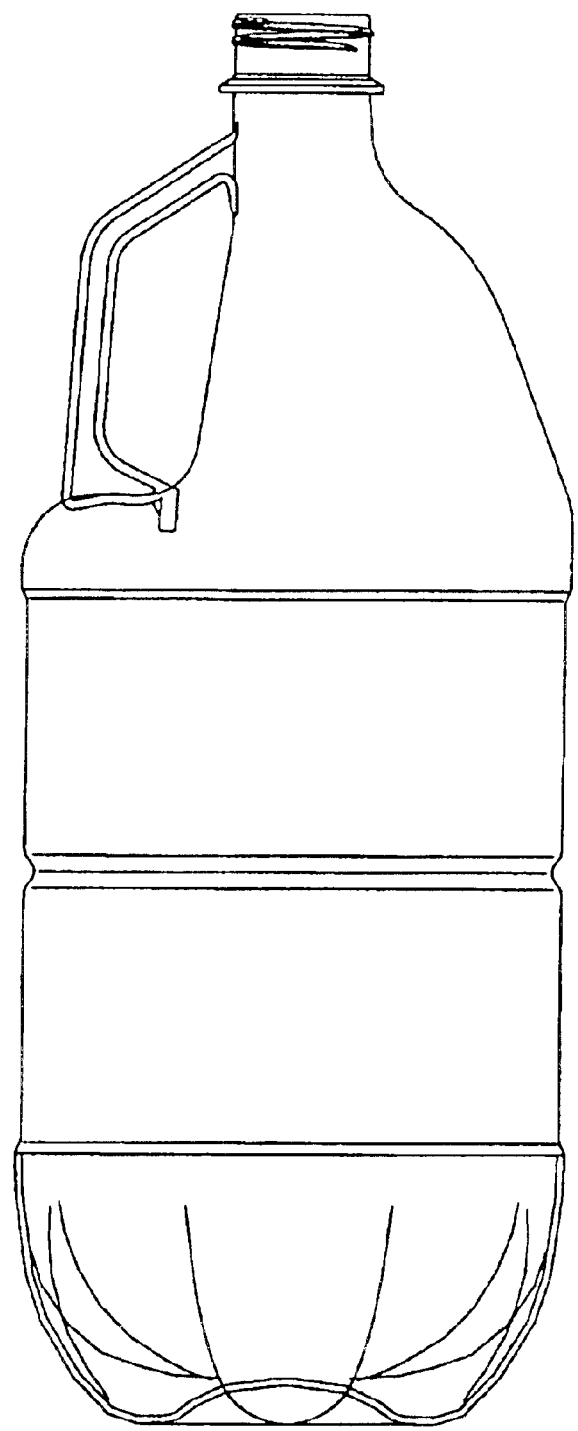
FIG. 26 is a side view of a container blown from the preform of FIG. 24 on the machine of FIG. 9.
Figure 27:
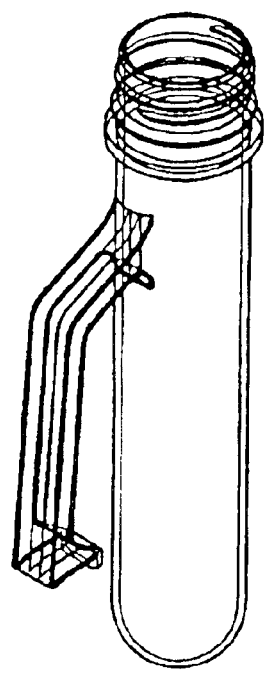
FIG. 27 is a perspective view of the preform of FIG. 24.
Figure 28:
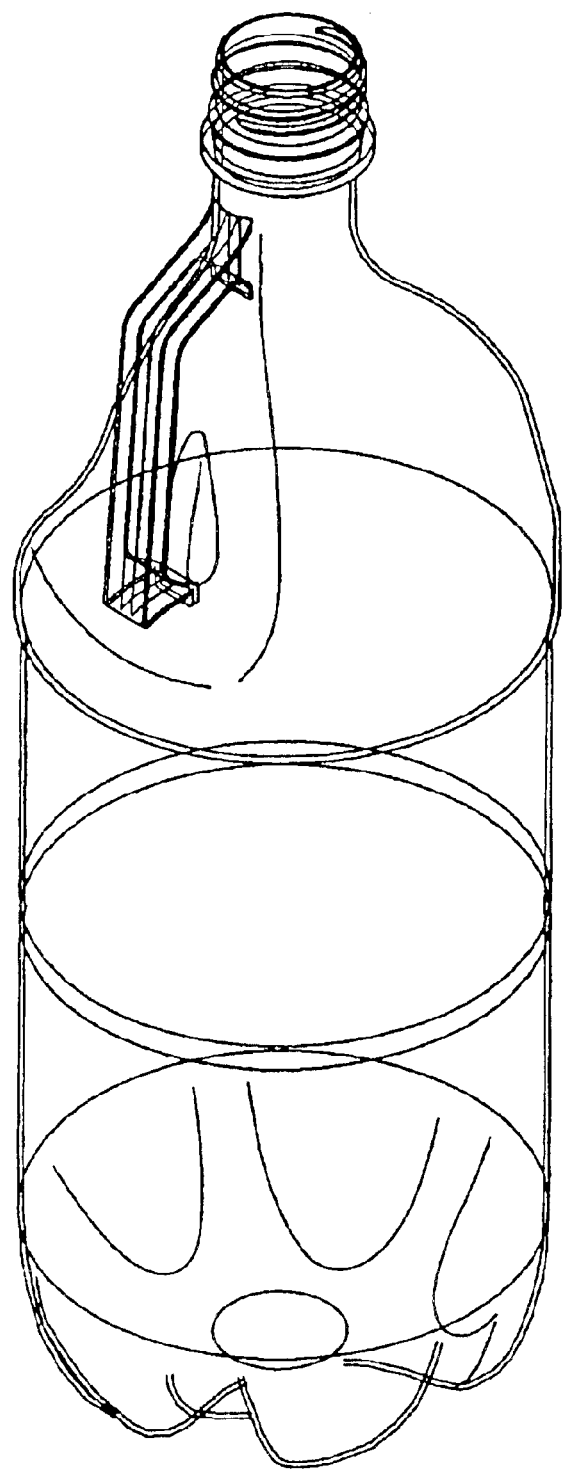
FIG. 28 is a perspective view of the container of FIG. 26.
Figure 29:
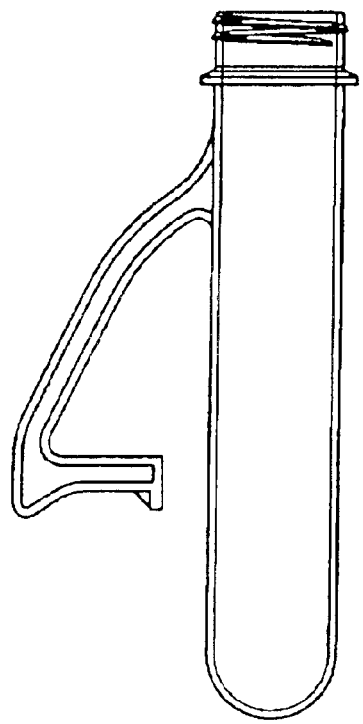
FIG. 29 is a side view of yet a further alternative embodiment of a preform incorporating a lengthened or enlarged first non-expanding zone and adapted for blowing on the machine of FIG. 9.
Figure 30:
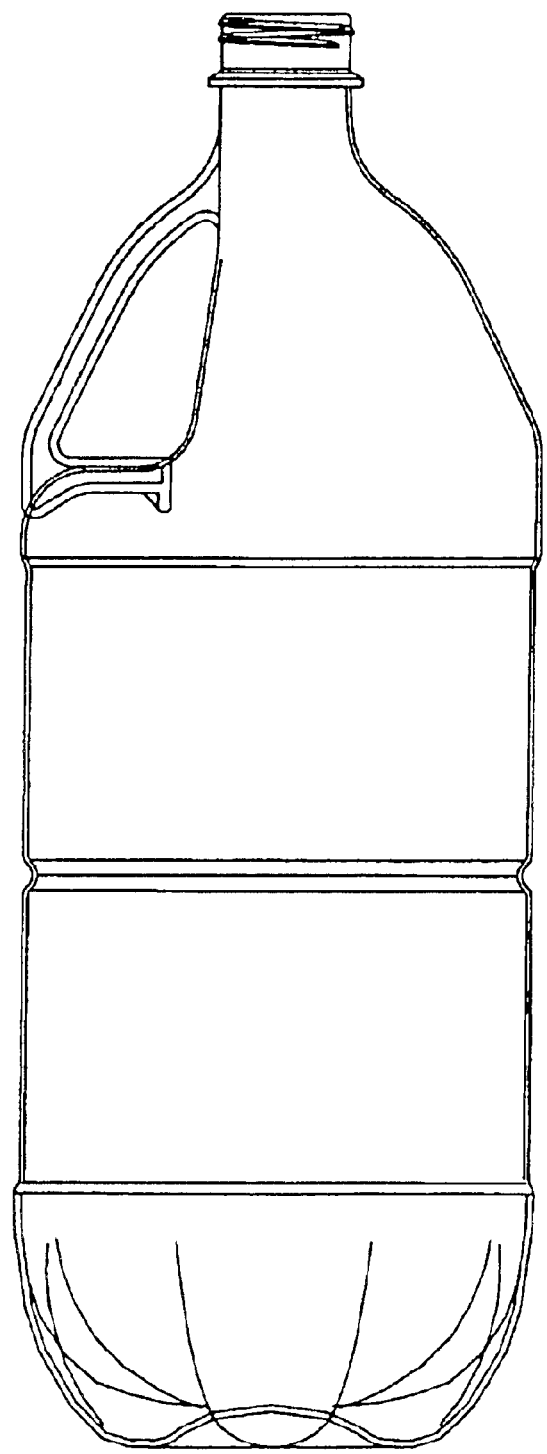
FIG. 30 is a side view of a container blown from the preform of FIG. 29 on the machine of FIG. 9.

FIGS. 13–23 illustrate details of a preform, mould and container blown therefrom and therein by the machine of FIG. 9. With reference to FIG. 13, in a preferred version, dimension A is greater than dimension B thereby to discourage tangling of preforms prior to loading into chute 113.

It will be observed that the top end of the handle is located close to the locating ring in this version. It will also be noted that the stem of the preform which subsequently constitutes the handle of the blown container is fully supported within the half mould during the entire blowing process. In contrast the walls of the container including portions of the container wall peripherally opposite the top end of the handle stem are free to be blown within the constraints of the mould.

With reference to FIGS. 24–34 a second version of a preform, mould and resulting blown container is illustrated wherein first non-expanding region 30 is relatively long in the axial direction including a portion 140 which extends from locating ring 141 down to and around at least a top portion of the connection of the handle stem 130 thereby forming a join of the top end of handle stem 130 to locating ring 141. (Best seen in FIG. 24).

Figure 32:
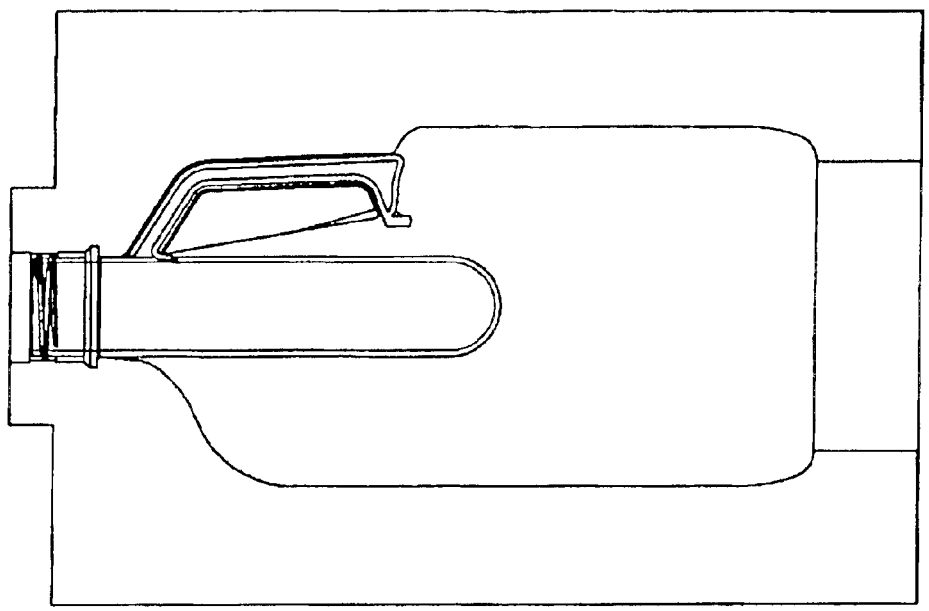
FIG. 32 is a plan view of the half mould of FIG. 31 with the preform of FIG. 24 inserted therein ready for blowing on the machine of FIG. 9.
Figure 31:
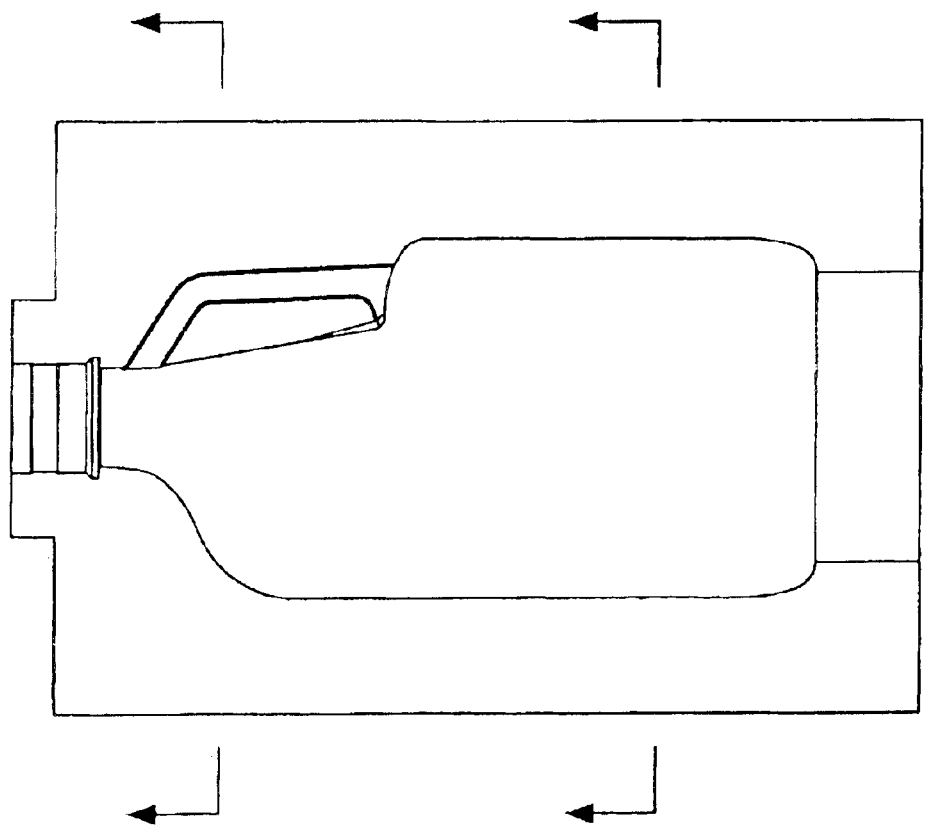
FIG. 31 is a plan view of a half mould for blowing the preform of FIG. 24.
Figure 34:
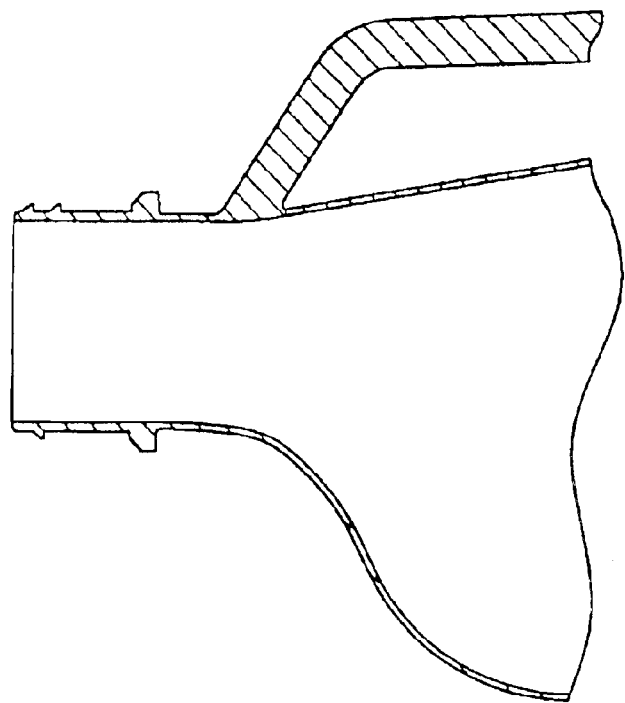
FIG. 34 is a detail side section view of the neck and top handle portion of the container of FIG. 33.
Figure 33:
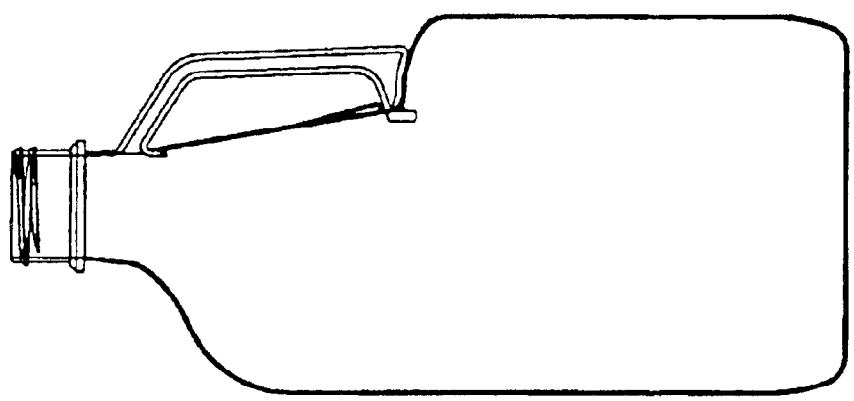
FIG. 33 is a side section view of a container blown in the mould of FIG. 32

In this version there is at least partial expansion of wall portions of the preform located peripherally away from the join of the handle stem 130 to the preform 112 (best seen in FIGS. 32 and 34). This expansion, relatively, is not as great as the biaxial expansion occurring below the first and second non-expanding regions 30, 31. It can, however, be significant in providing strength and resistance to gas permeation in at least second non-expanding region 31, if not non-expanding region 30.

Container Resistant to Internal Pressures

Figure 40:
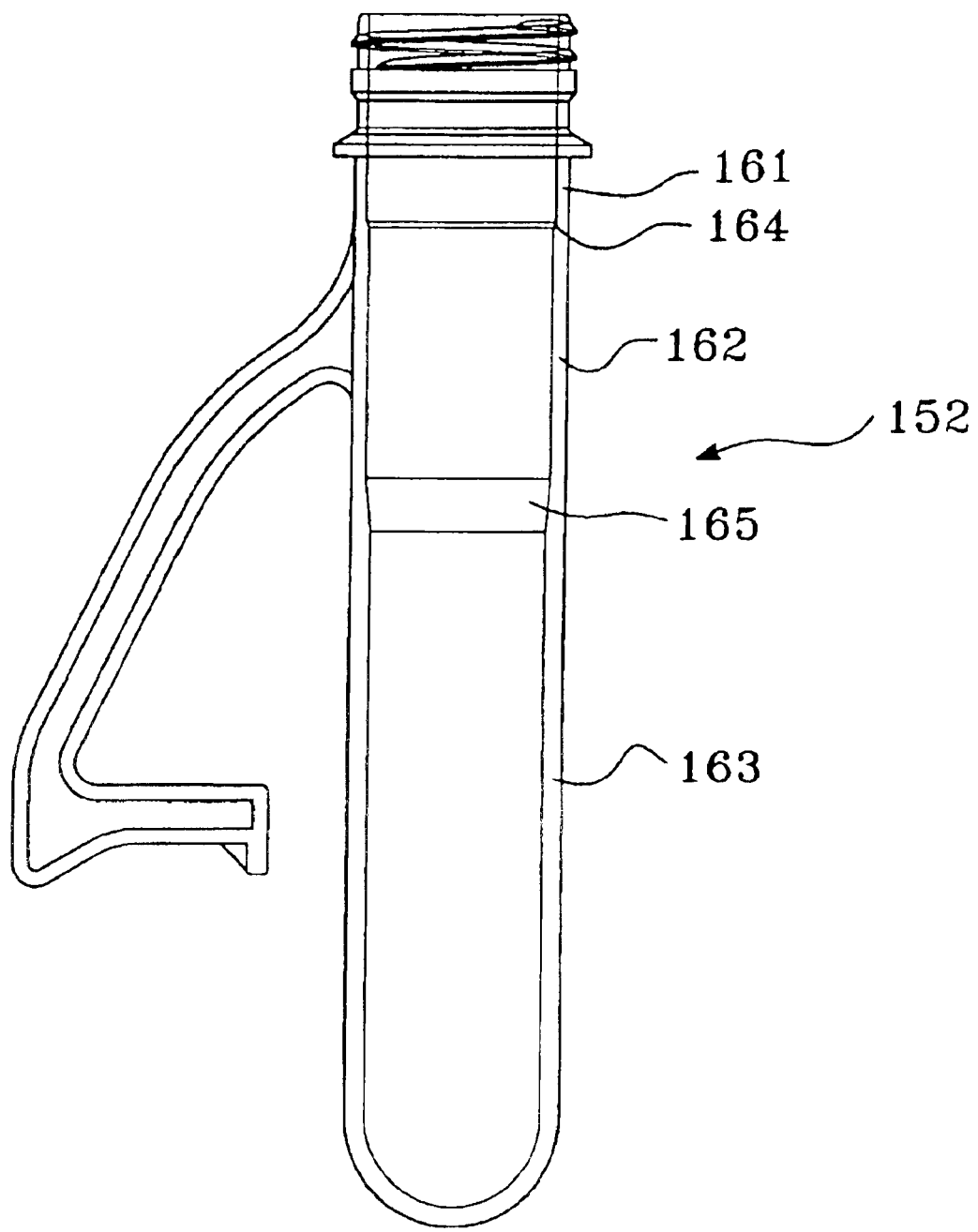
FIG. 40 is a side view of a preform from which the container of FIG. 35 can be blown.
Figure 41:
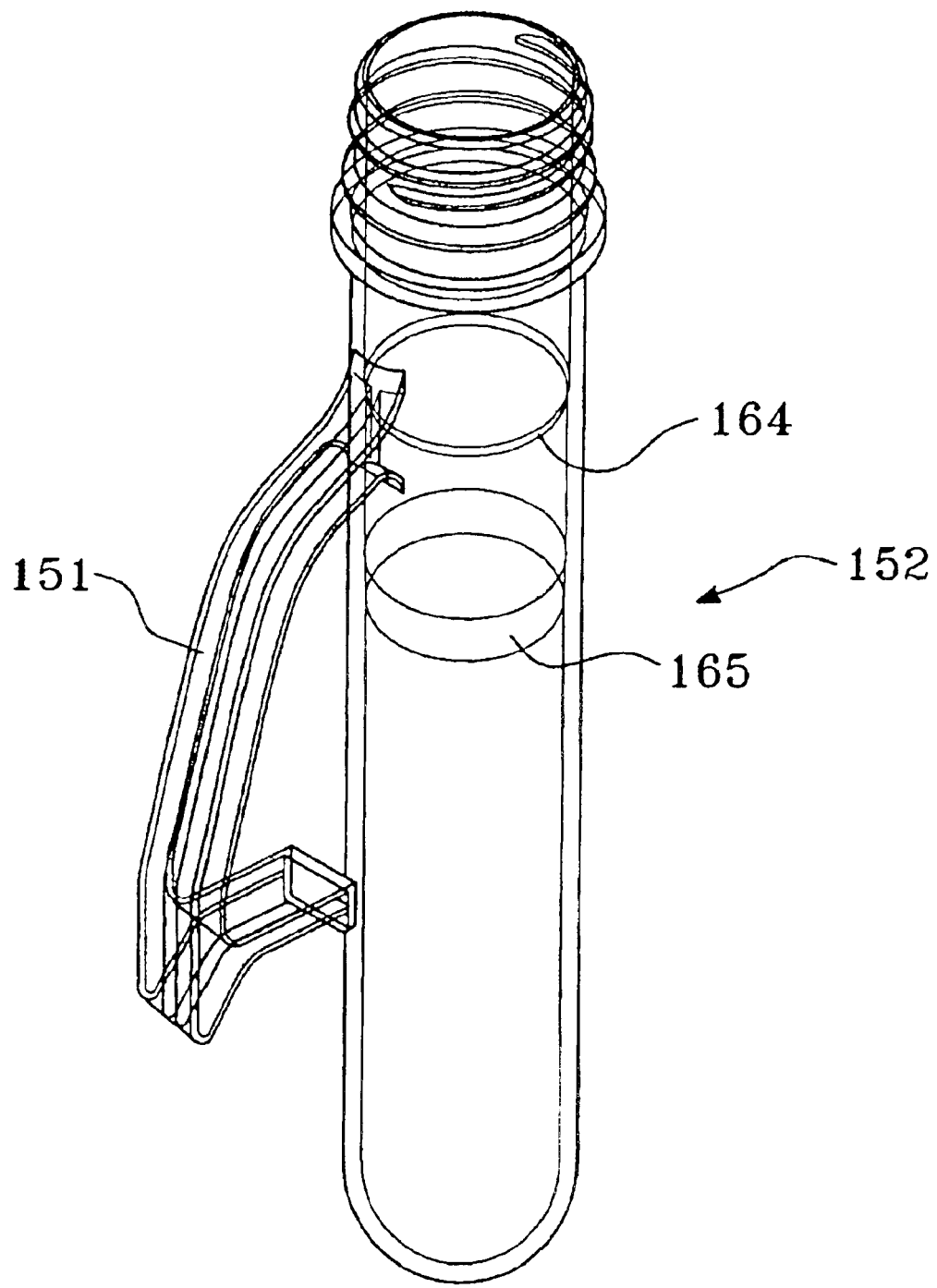
FIG. 41 is a perspective view of the preform of FIG. 40.

With reference to FIGS. 35 to 39 there is shown a container 150 incorporating an integral handle 151 which is biaxially blown from the preform 152 illustrated in FIGS. 40 and 41.

Figure 36:
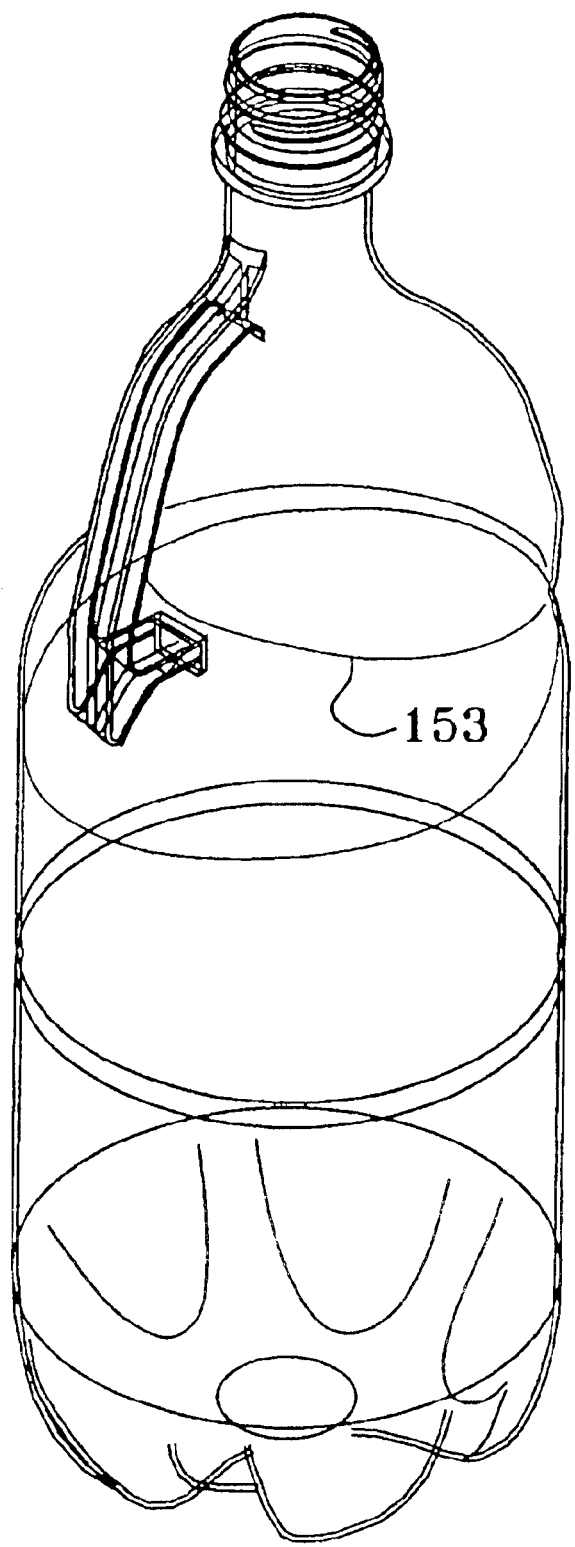
FIG. 36 is a second perspective view of the container of FIG. 35.
Figure 39:
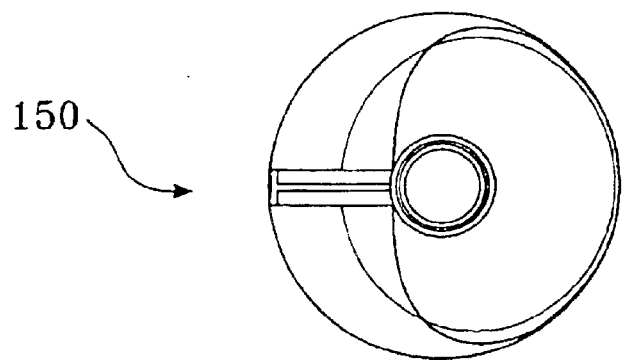
FIG. 39 is a plan view of the container of FIG. 35.
Figure 37:
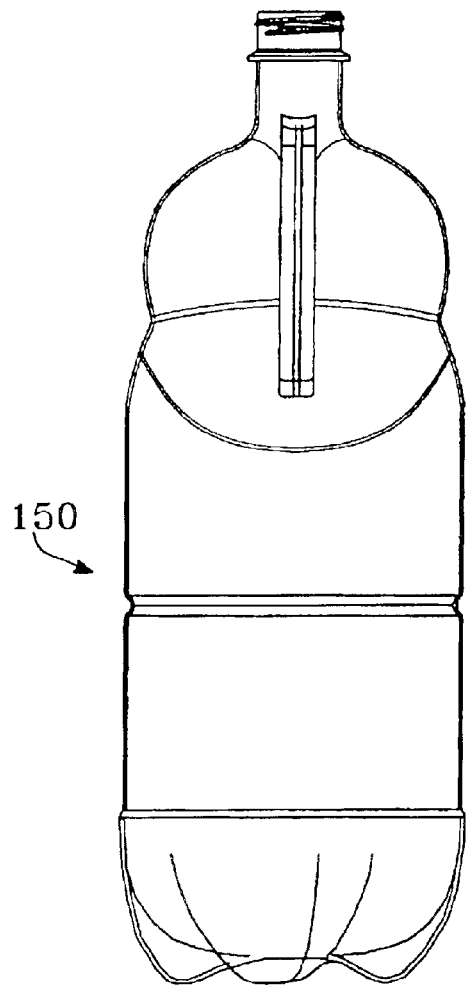
FIG. 37 is a first side view of the container of FIG. 35.

In this instance, as perhaps best seen in FIG. 36, the blown container 150 includes a discontinuity region 153. In this instance the discontinuity region 153 extends the entire circumference of the container 150.

Figure 38:
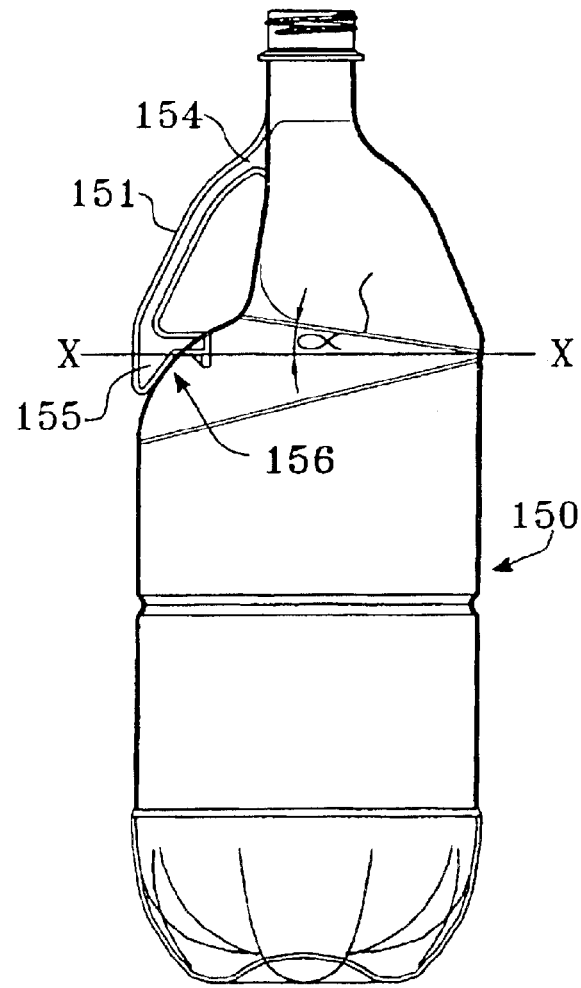
FIG. 38 is a second side view of the container of FIG. 35.

As best seen in FIG. 38 the discontinuity region 153 lies in a plane which subtends an acute angle alpha with a horizontal plane XX.

The plane of the discontinuity region 153 is oriented so that where it passes closest to the integral handle 151 it lies between first end 154 and second end 155 of the handle 151.

In this instance that part of the discontinuity region 153 located furtherest from the handle 151 lies in the plane XX which passes through, or close to, join region 156 where the second end 155 of handle 151 is joined to container 150.

Figure 35:
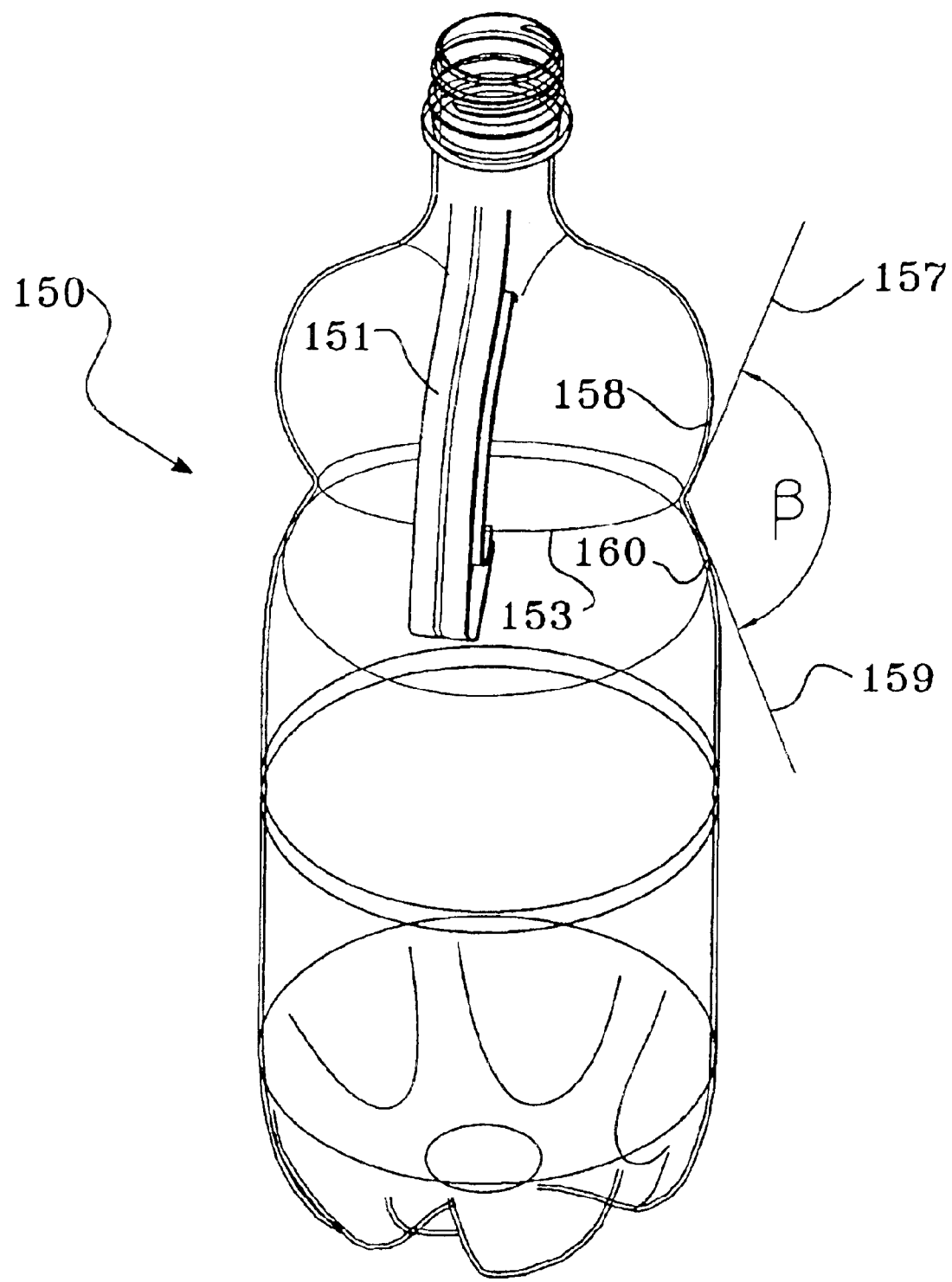
FIG. 35 is a first perspective view of a container usable with embodiments of the invention particularly adapted to resist high internal pressures.

The discontinuity region 153 is formed by a substantial change in direction of the wall of the container 150, perhaps best seen in FIG. 35 wherein first tangent 157 to upper wall portion 158 intersects with second tangent 159 to lower wall portion 160 of container 150 at an obtuse angle beta, thereby forming a portion of the discontinuity region 153.

This discontinuity region 153 imparts additional strength to the container walls, thereby to resist deformation of, particularly from internal pressures which can arise when the container is sealed, as for example when the container contains a carbonated beverage.

In order to assist in the creation of the discontinuity region 153 the preform 152 from which the container 150 is biaxially blown includes different wall thickness profiles, in this instance in the form of first wall profile 161, second wall profile 162 and third wall profile 163 separated one from the other by first transition zone 164 and second transition zone 165 as best seen in FIG. 40.

It will be observed that the wall thickness of third wall profile 163 is greater than the wall thickness of second wall profile 162 which, in turn, is greater than the wall thickness of first wall profile 161.

The second end 155 of the handle 151 is joined to the container during a biaxial blowing operation by defamation and envelopment about the second end 155. The second end 155 can include a bulbous portion including a bulbous portion of the types illustrated in FIG. 2.

The preform 152 can be manufactured from PET materials in an injection moulding operation as described earlier in this specification.

The preform 152 is then blown as a second stage operation in a stretch blow moulding machine so that its walls conform to the inside surfaces of a mould, also as described earlier in this specification.

Tag Connected Handle

Figure 42:
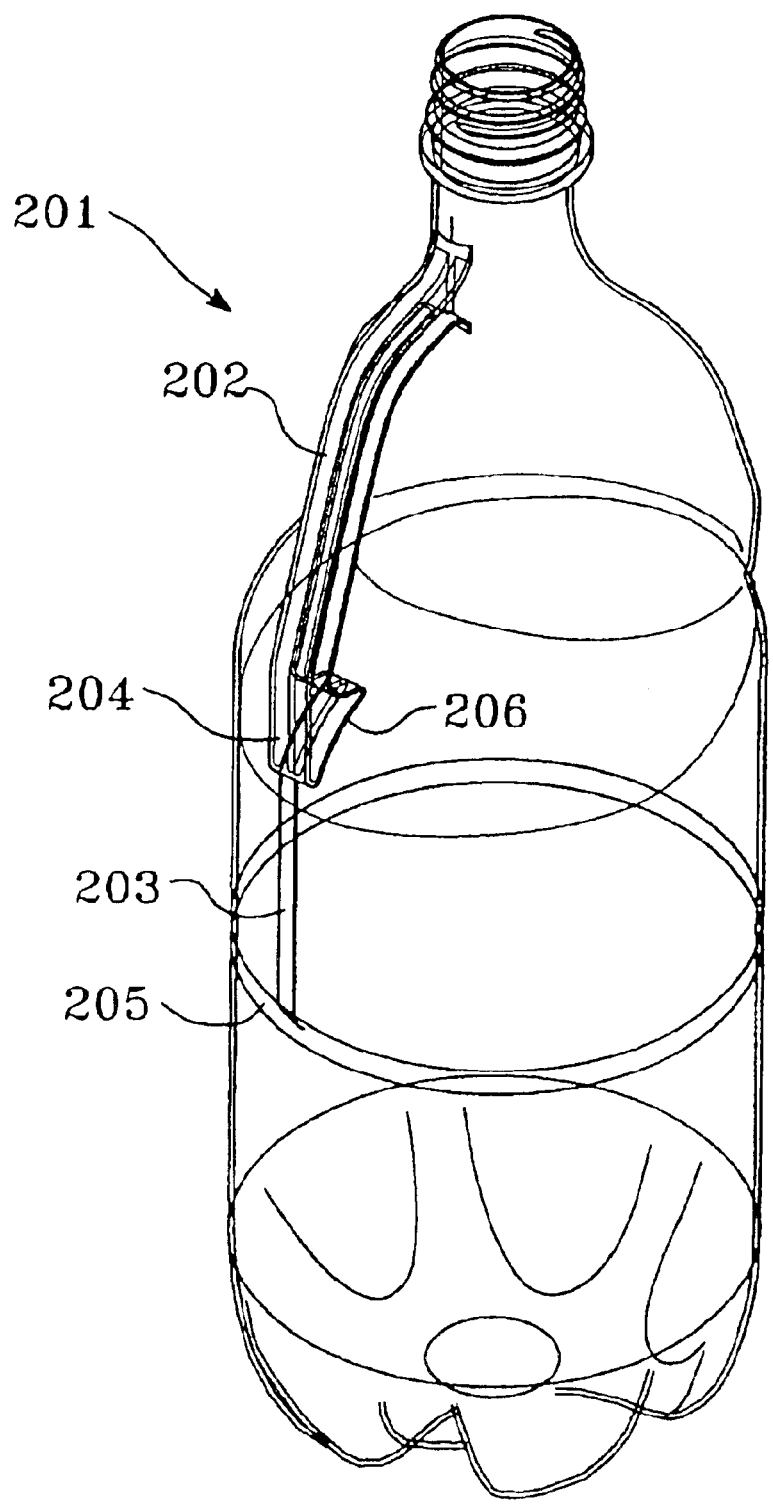
FIG. 42 is a perspective view of a container with strap connected handle according to an embodiment of the invention.
Figure 43:
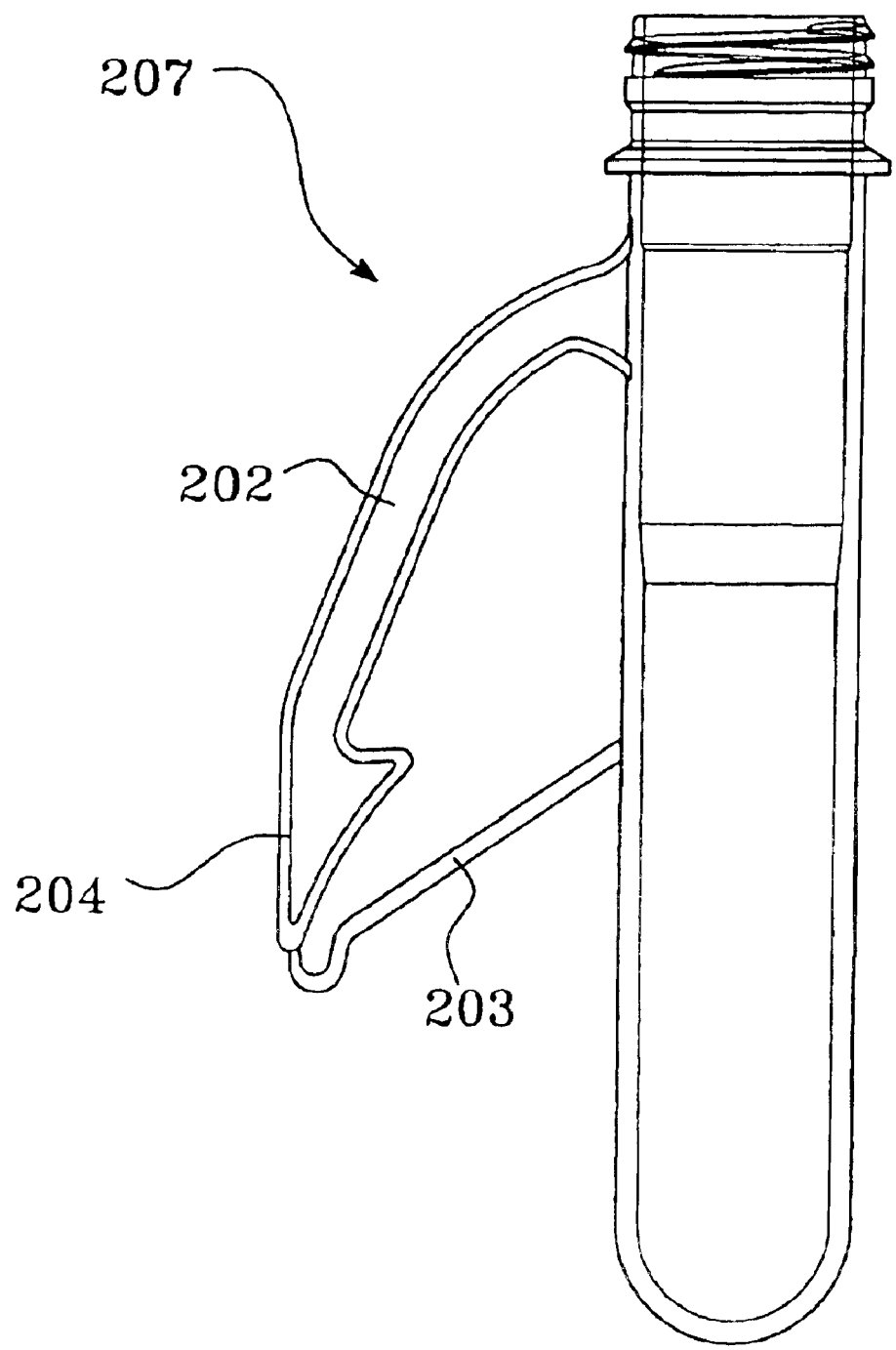
FIG. 43 is a side view of a preform from which the container of FIG. 42 can be blown.

With reference to FIG. 42 and FIG. 43 an alternative version of the container and the preform from which it is constructed are illustrated and comprises a rudimentary form of the multiple integral connection handle arrangement of the invention.

With reference to FIG. 42 the container 201 includes an integral handle 202 as previously described and constructed, save that the connection to the lower end of the container 201 is formed as an integral connection by way of a tag 203 which extends from a lower edge 204 of a wide part of the handle 202 down to a mid circumferential portion 205 of container 201 at which point it is integrally connected thereto. The lower edge 204 of the wide part of the handle 202 includes a landing portion 206 which merely rests on the surface of the container 201 at this point rather than being integrally connected thereto or otherwise connected thereto at this point.

A preform 207 from which the container 201 of FIG. 42 is blown is illustrated in FIG. 43. This preform 207 is constructed substantially in the same manner as that illustrated in FIG. 40 except that lower edge 204 of handle 202 is integrally connected to the preform 207 by way of tag 203 in the manner illustrated in FIG. 43.

Figure 11:
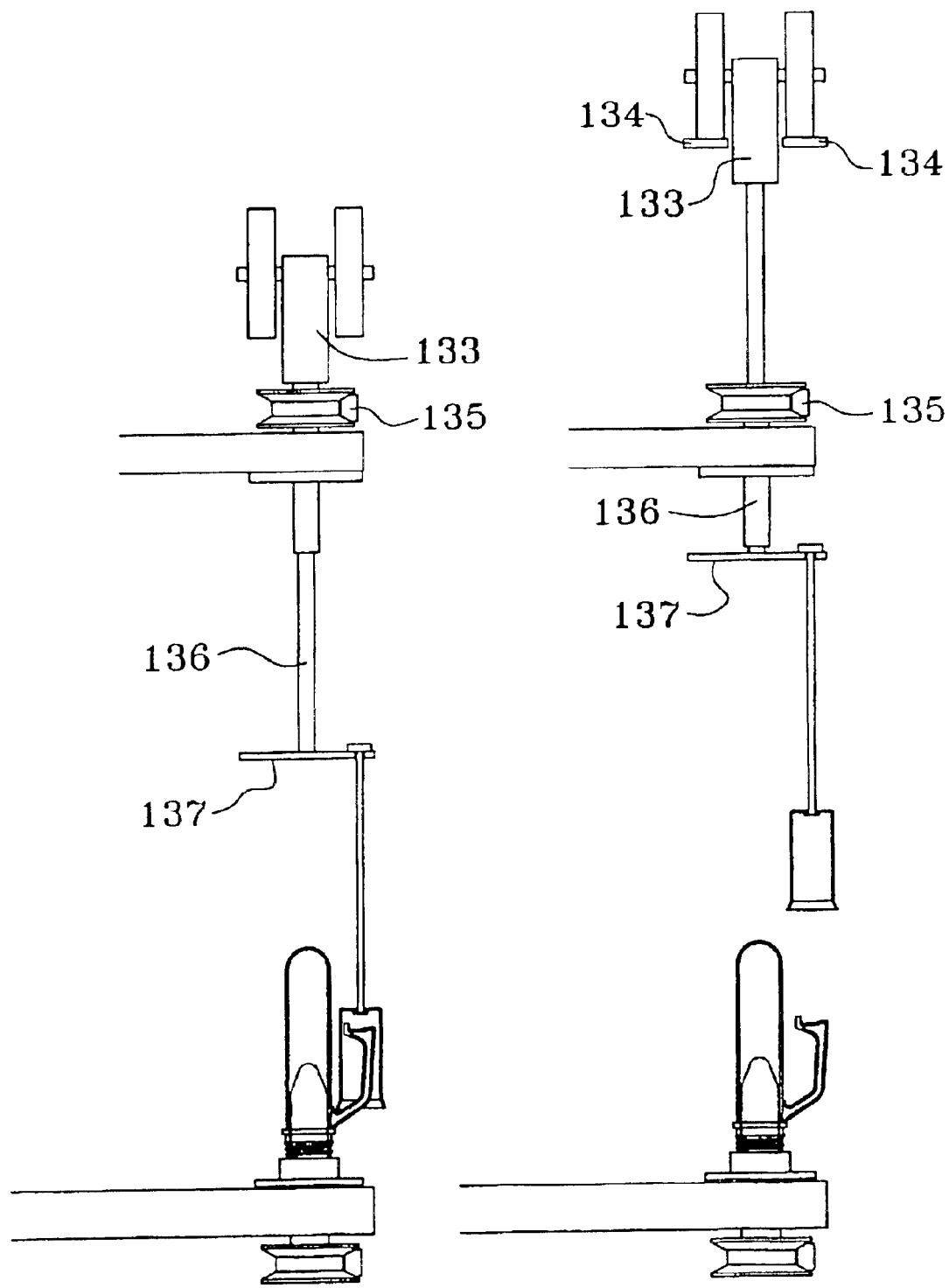
FIG. 11 is an alternative side section view of the mechanism of FIG. 10.

The preform 207 is blown to form the container of FIG. 42 utilising the process previously described with reference to FIGS. 10, 11 and 12.

Preform and Container with Multiple Integral Connection Handle

Figure 44:
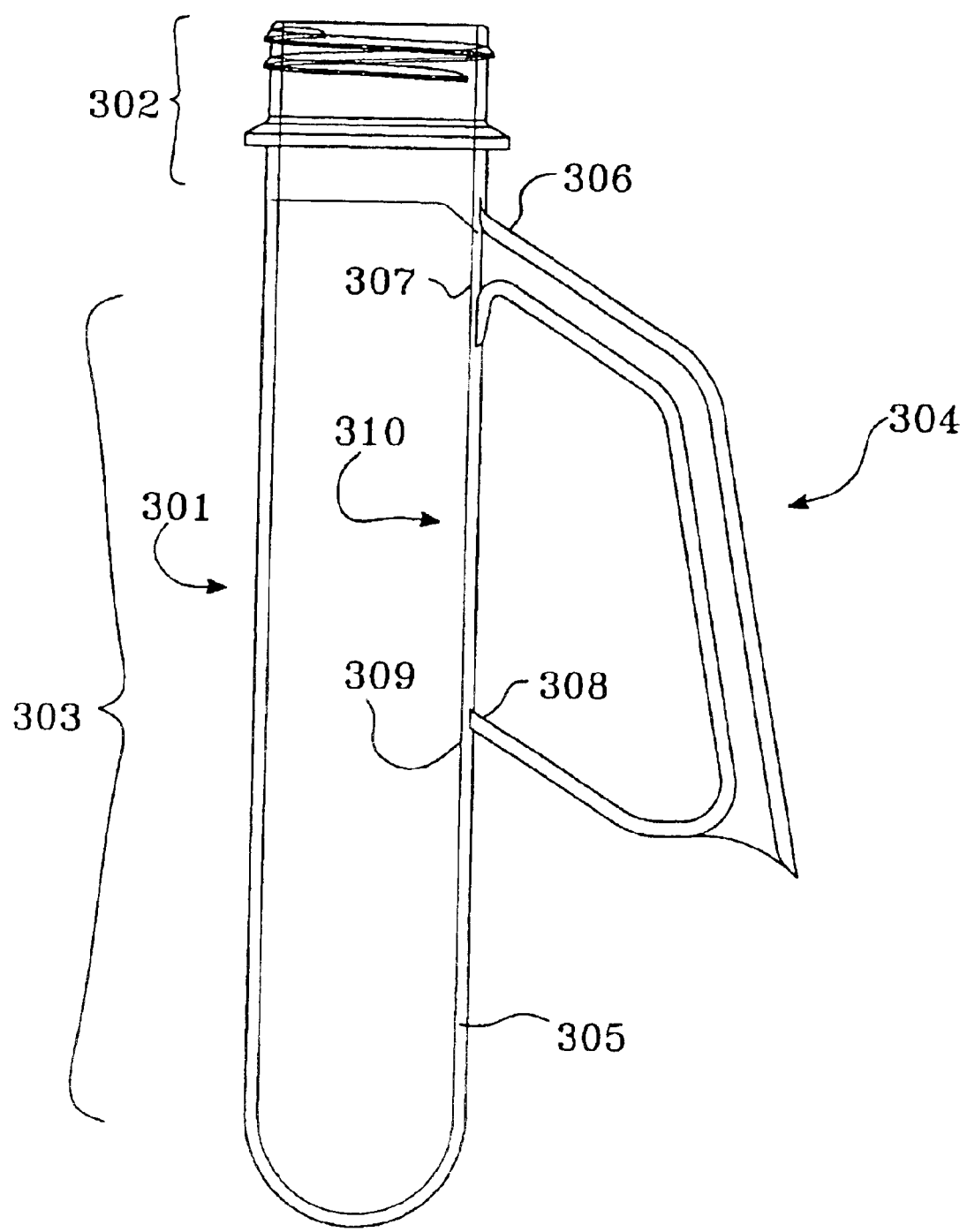
FIG. 44 is a side section view of a preform having a multiple integral connection handle according to an embodiment of the invention.

With reference to FIG. 44 there is shown a preform 301 having a neck portion 302 and an expandable portion 303 located therebelow.

In substitution for the stem of the earlier examples in this specification is a loop 304 made from the same material as the wall 305 of the preform 301. In this instance the loop 403 is integrally connected at a first end 306 to a first location 307 on and forming part of the wall 305.

The other of the loop 304 being second end 308 is integrally connected into wall 305 at second location 309.

The loop 304 is formed in the same mould as and at the same time as the preform 301 is moulded, in a preferred form from PET plastics material.

Figure 47:
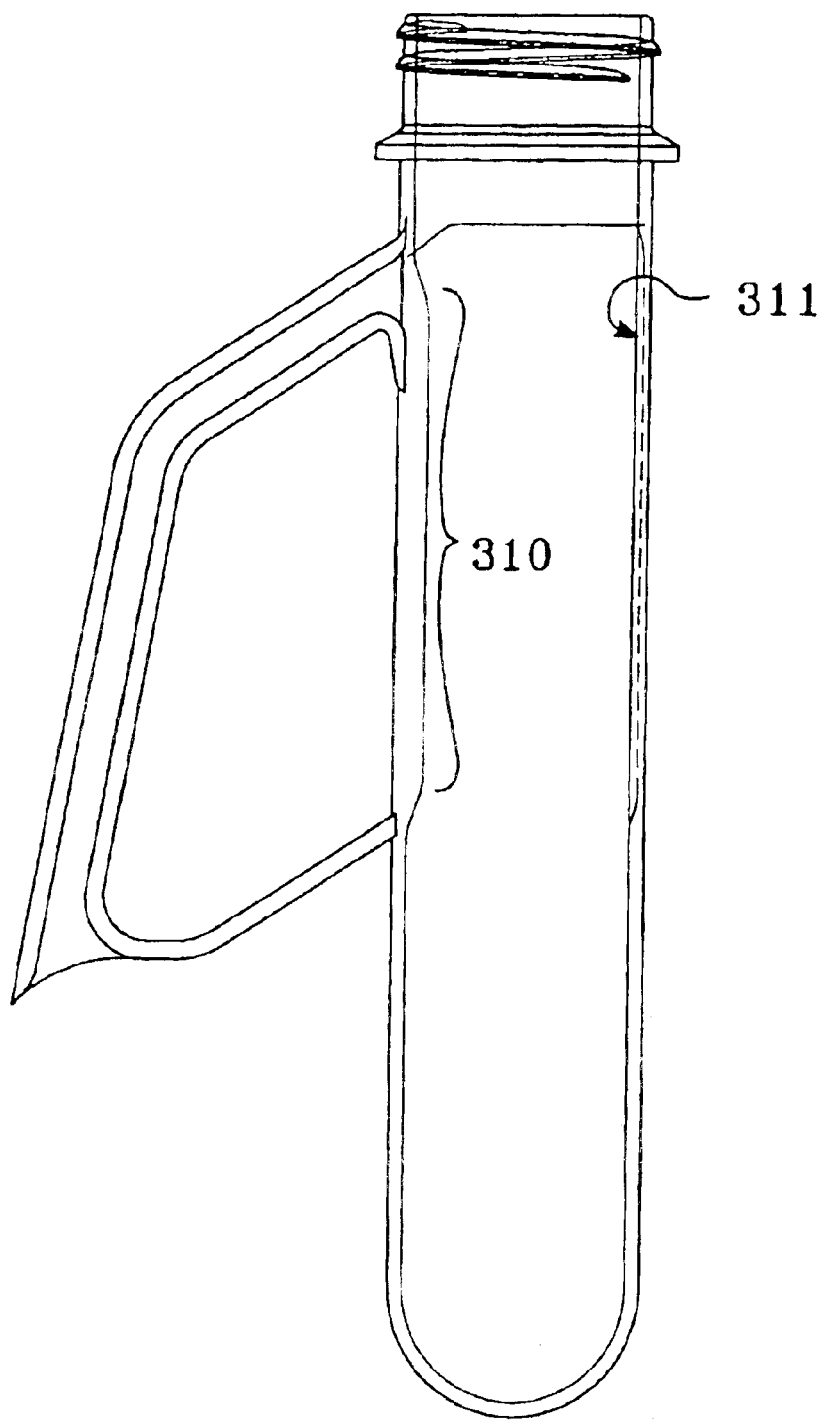
FIG. 47 is a side section view of a preform having a multiple integral connection handle according to a further embodiment of the invention.
Figure 48:
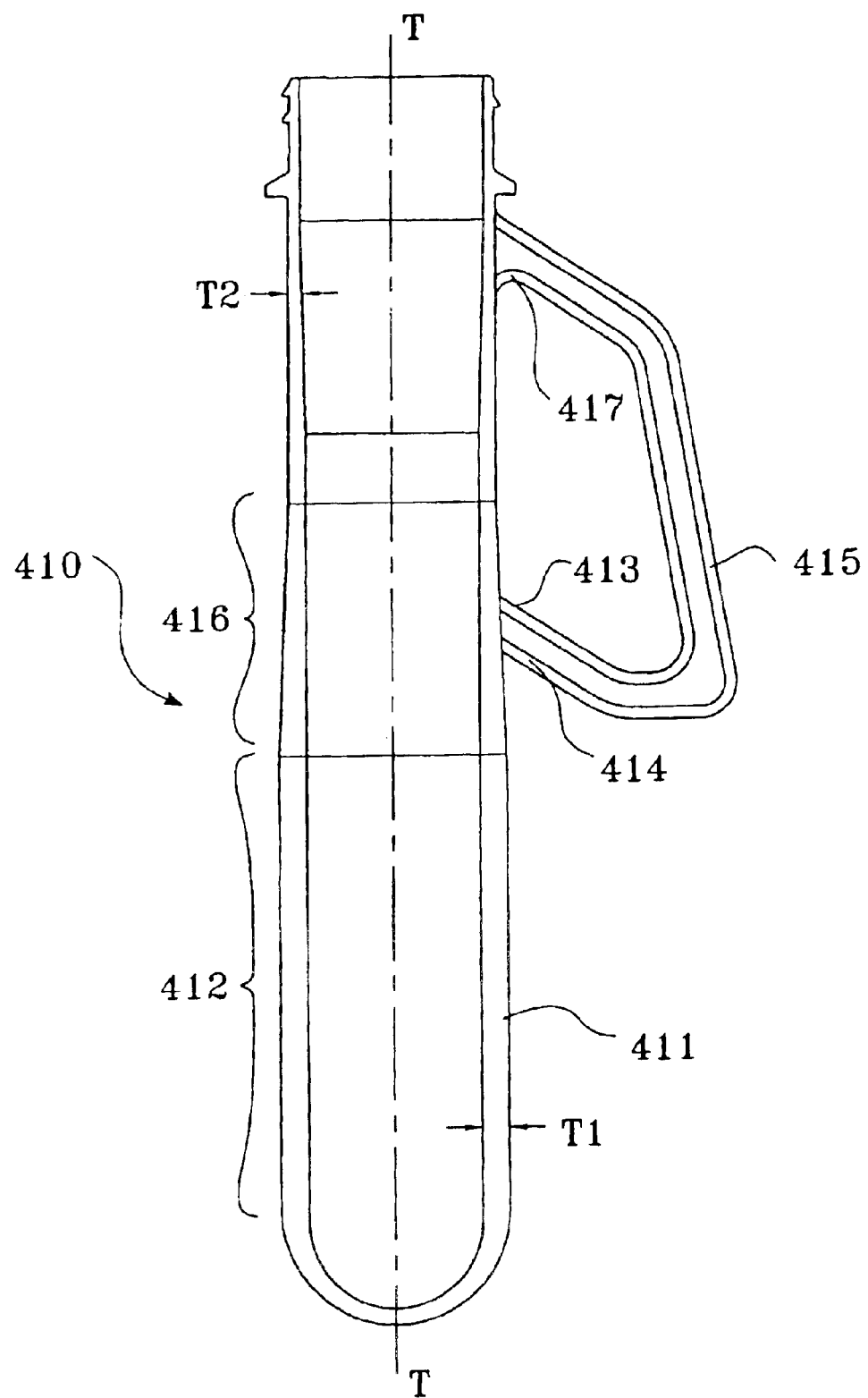
FIG. 48 is a side section view of a preform having a multiple integral connection handle according to a further embodiment of the invention.
Figure 49:
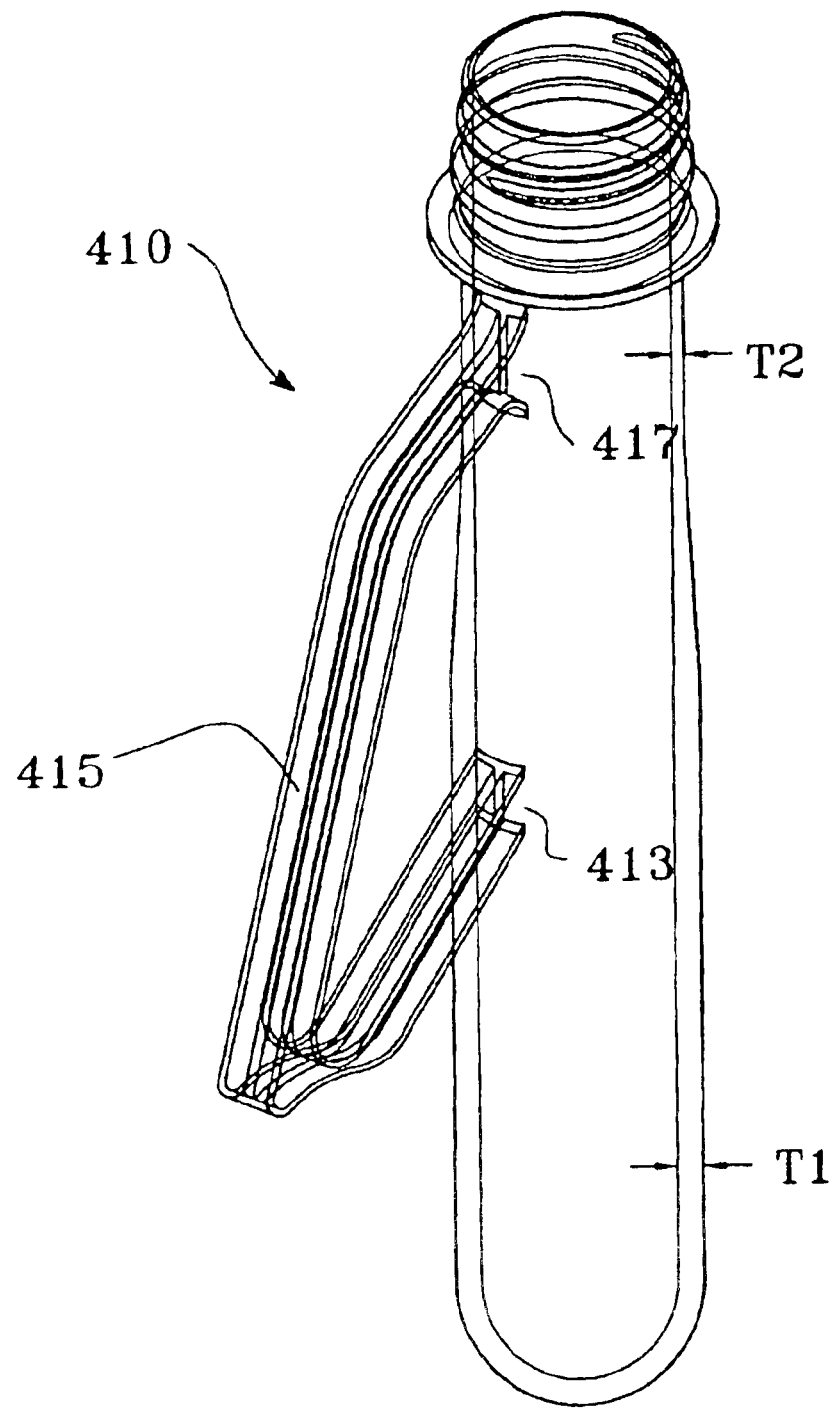
FIG. 49 is a perspective view of the preform of FIG. 48.

In this instance and with reference to FIG. 47 the loading of plastics material in the region of the wall 305 subtended between first location 307 and second location 309 can be differentially controlled as a function of location on the circumference of the wall 305 in this region designated the differential loading region 310 in FIG. 47.

In this particular instance there is an increased loading of material in the region of 310 immediately between the first location 307 and second location 309 whilst, the opposite region 311 located diametrically opposite region 310 has material removed from it as indicated in dotted outline.

Figure 45:
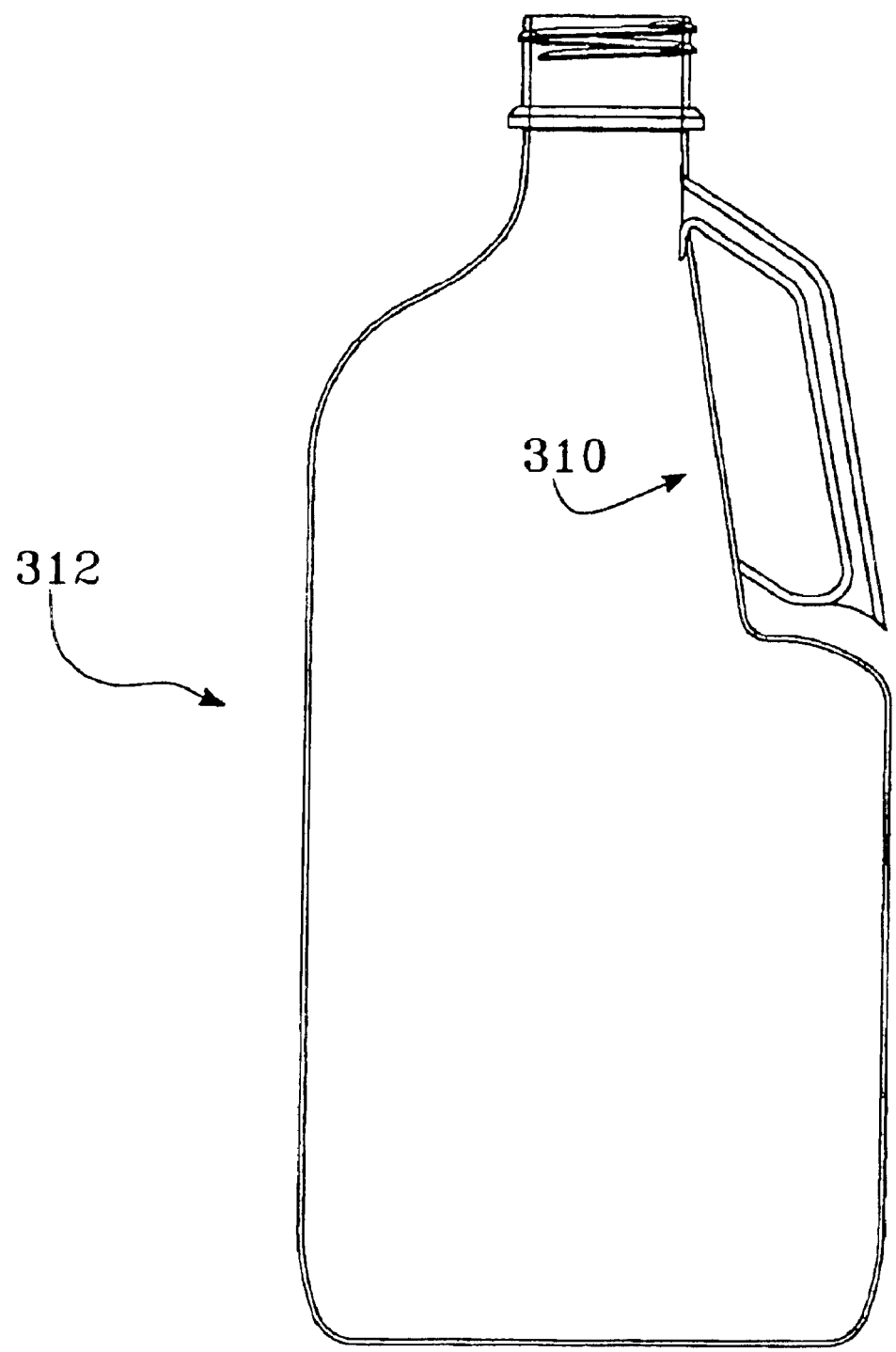
FIG. 45 is a side section view of the resulting container blown from the preform of FIG. 44.

Differential material loading as a function of circumferential position on wall 305 aids in providing control over the wall thickness of the blown container 312 illustrated in FIG. 45.

The container 312 can be blown in a two stage process utilizing the apparatus previously described in this specification and utilizing the shielding principals also described.

In this example the region 310 subtended between first location 307 and second location 309 remains substantially unchanged during the blowing process and can be considered an extension of and part of the next portion 302 of the preform 301.

Figure 46:
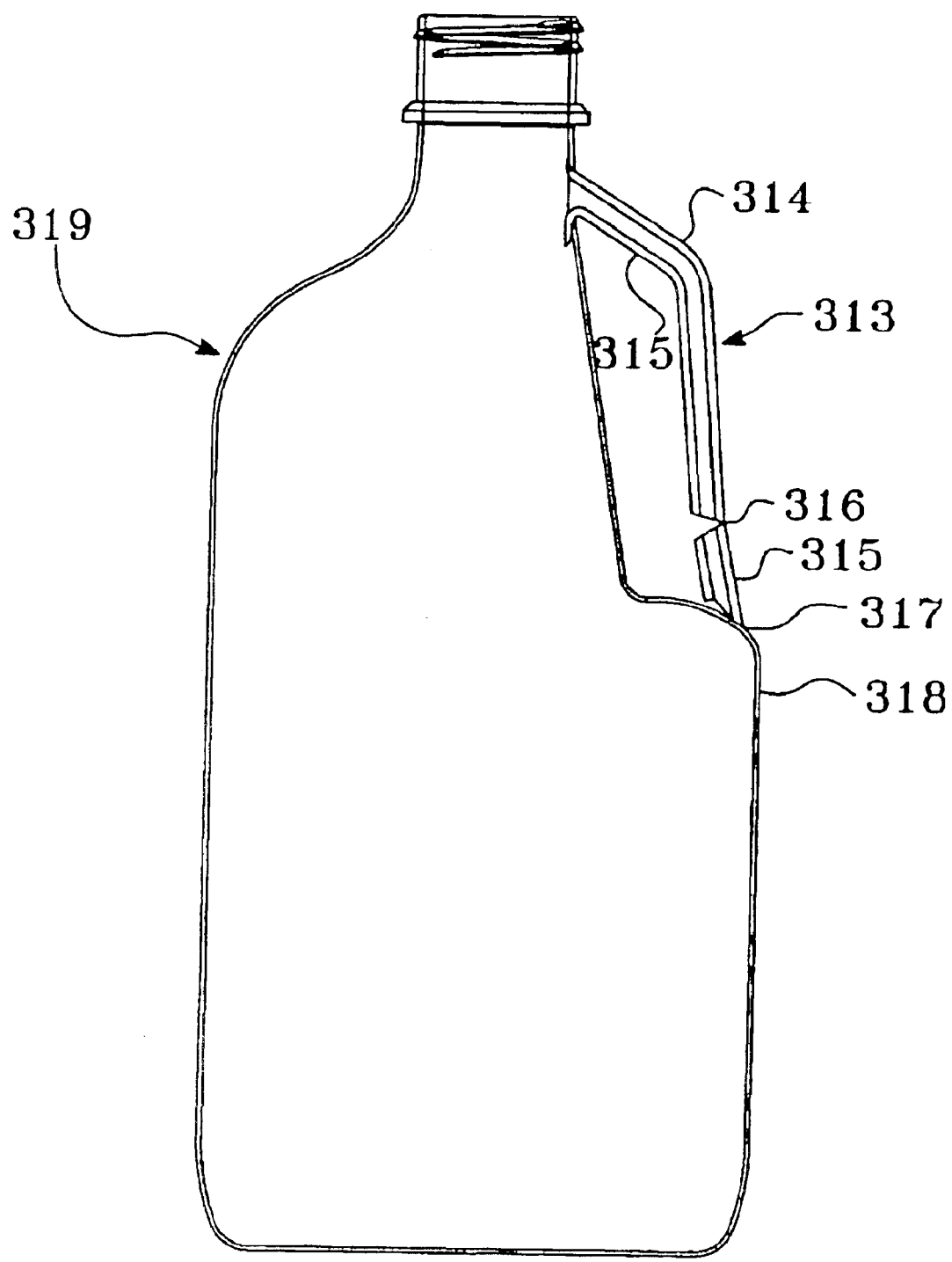
FIG. 46 is a side section view of an alternative embodiment of a container having a multiple integral connection handle.

FIG. 46 illustrates an alternative form of construction of a loop 313 which, in this instance, again comprises an elongate, stem-like structure including reinforcing ribs 314 but having, in this instance, a deflectable portion 315 which is connected on one side by a first bridge portion 316 to the balance of the loop 313 and, at its other end by a second bridge portion 317 integrally to container wall 318.

In this instance the second bridge portion 317 is akin in structure to the tag 203 previously described and provides a necessary element of flexibility. A first bridge portion 316 can be of the same kind of structure and, again, being integrally formed at the time that the preform is blown.

In use, during a second stage blowing of the container 319 it will be observed that the container wall 318 to which second bridge portion 317 is integrally connected moves during blowing and this movement is accommodated by deflection of deflectable portion 315, loop 313 about first bridge portion 316 and second bridge portion 317.

In production, utilizing the apparatus previously described, it is possible to move material differentially within a wall portion such as, for example, in the differential loading region 310 it is possible to cause the material closest to the inside of the container to move whilst leaving the material closest to the outside of the container essentially static relative to first location 307 and second location 309, thereby leaving the outside wall region stable during the second stage blowing step.

In production in a two stage machine it is important to have a heating tunnel of sufficient width to allow for rotation of the preforms with stem/loop protecting thereon. It is also important to have the ability to shield in a controllable manner the stem/loop portions of the preform during its pass through the heating tunnel and also the ability to selectively shield that region of the preform wall subtended between and beneath the stem/loop thereby to provide an important element of control over the heat profile throughout the preform immediately prior to its insertion into the mould cavity for the second stage blow moulding step.

In a particular form the heat shield can be attached to a mandrel and can pass into the mould cavity for retention therein during the second stage blowing step.

Whilst a single handle has been shown on embodiments described thus far it will be appreciated that more than one handle can be provided on a given container following the principals described in this specification.

A preform 410 according to a further embodiment of the invention is illustrated in side section view and, in this instance, includes a symmetrical thickening of the wall 411 of the preform 410 in the lower region 412 which extends from immediately below the point of connection 413 of the lower end 414 of handle 415. In a second, intermediate region 416 located between point of connection 413 and point of connection 417 of handle 415 the wall thickening of the preform 410 tapers gradually from first thickness T1 to second (thinner) thickness T2.

This thickening is symmetrical about the longitudinal axis TT of preform 410 and results in a controllable increase in the thickness of material in blown container 418 (refer FIG. 50) in the corresponding intermediate region 416, but also in a sub-region 419 immediately below point of connection 413 of the lower end of handle 414. It is postulated that the increased thickening of the blown container in the region 419 results from a flowing of the material from intermediate region 416 through to sub-region 419 during the second stage process of blow moulding, thereby to provide control over the wall thickness of material in the region 419 of the blown container 418.

Figure 51:
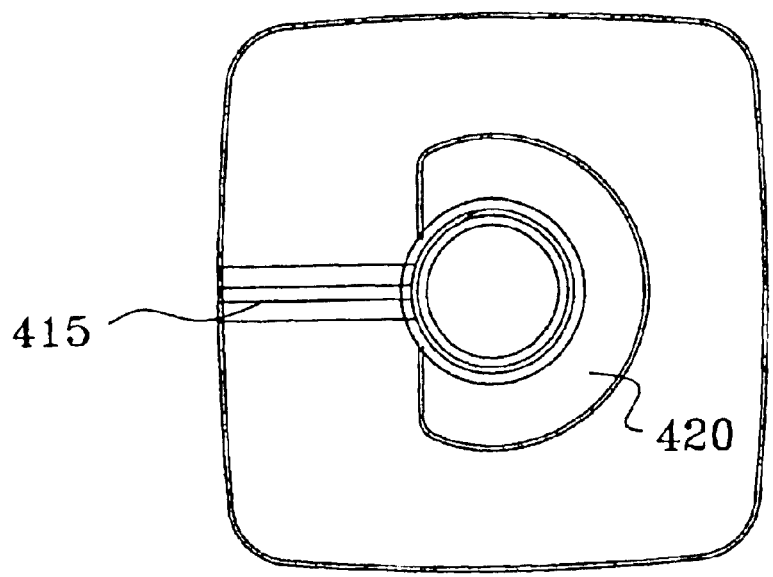
FIG. 51 is a top view of the container of FIG. 50.
Figure 52:
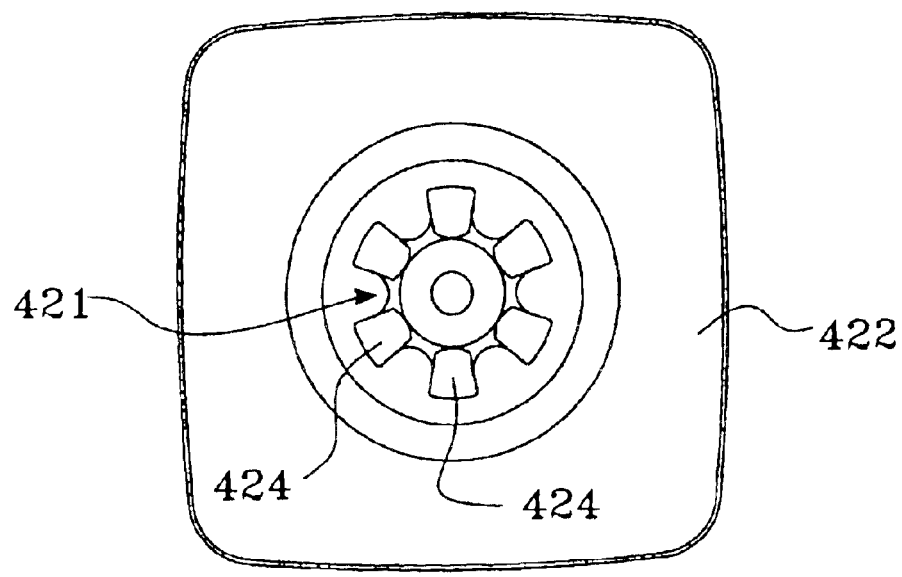
FIG. 52 is a bottom view of the container of FIG. 50.

FIGS. 51 and 52 provide alternative views of the blown container 418. FIG. 51 illustrates more clearly the anti-symmetric bulbous portion 420 which is offset about the longitudinal axis TT with respect to handle 415.

FIG. 52 illustrates a star formation indentation 421 in base portion 422 of container 418. It comprises a central, circular indentation 423 from which subtend wedge shaped indentations 424 in a circular array as illustrated in both FIG. 50 and FIG. 52.

Figure 50:
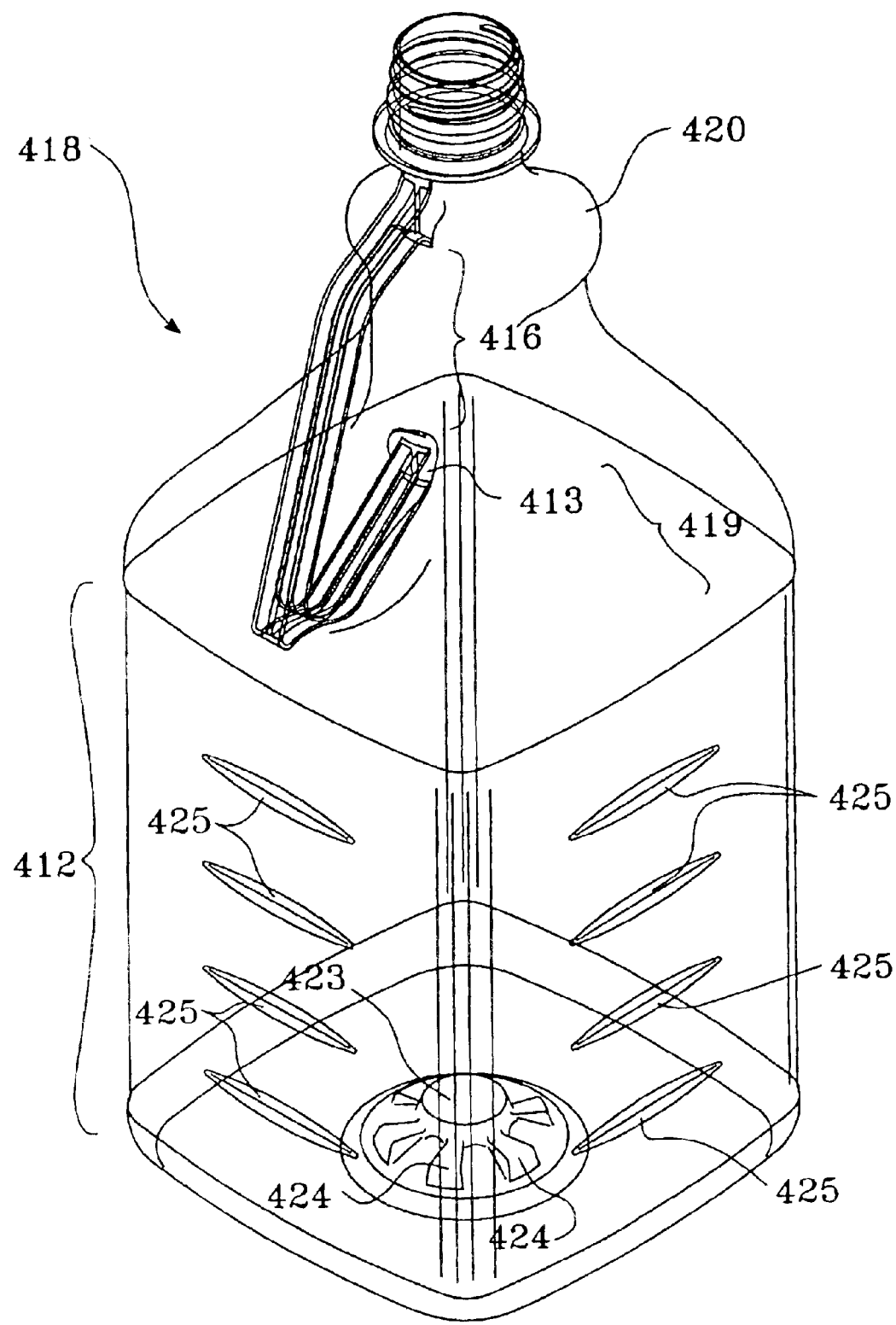
FIG. 50 is a perspective view of a container blown from the preform of FIG. 48.

In this instance container 418 also includes longitudinal indentations 425 in the walls of region 412 as illustrated in FIG. 50, thereby to increase the strength of the blown wall portions in this region.

The above describes only some embodiments of the present invention and modifications obvious to those skilled in the art can be made thereto without departing from the scope and spirit of the present invention.

INDUSTRIAL APPLICABILITY

Embodiments of the invention are applicable to the manufacture of containers made from orientable plastics material and incorporating a handle or like grasping fixture as an integral component of the container.

What is claimed is:

1. A preform for a container comprised of orientable plastics material and arranged so that the resultant blown container will include a handle, said preform comprising:

a moulded structure having a neck portion and an expandable portion below the neck portion;

a locating ring between the neck portion and the expandable portion;

a first non-expanding region below the locating ring, the first non-expanding region formed so as to be slightly raised or otherwise differentiated from the expandable portion of said perform;

a second non-expanding region below the first non-expanding region, wherein the second non-expanding region is not differentiated from the expandable portion of said perform; and at least one loop of orientable plastics material integrally connected at both a first end and a second end to a respective first location and a separate second location on said preform which when the container is formed constitutes said handle, the loop including a first rib integrally moulded therewith, and a second rib integrally moulded with and extending from the second non-expanding region.

2. The preform of claim 1 which further includes a rib connector integrally moulded with and extending from first non-expanding region and forming a continuous connection between said first rib and said second rib throughout the length of said loop.

3. The preform of claim 2 and wherein said second non-expanding region forms part of a temperature transition zone.

4. The preform of claim 3 and wherein said first non-expanding region forms part of said temperature transition zone.

5. The preform of claim 3 wherein deformation of said temperature transition zone takes place during a stretch blow moulding process.

6. The preform of claim 5 manufactured by a two stage injection moulding process wherein material is injected at different locations in the die to form a preform adapted to be compose from more than one type of material.

7. The preform of claim 6 wherein during at least one stage of said two stage process an inner wall and outer wall of said preform is formed, said inner wall adapted to be made from a different material from said outer wall.

* * * * *